United States Patent
Balakrishnan et al.

(10) Patent No.: US 9,703,719 B2
(45) Date of Patent: Jul. 11, 2017

(54) FAST READ FOR NON-VOLATILE STORAGE

(71) Applicant: SANDISK TECHNOLOGIES INC., Plano, TX (US)

(72) Inventors: Gopinath Balakrishnan, Santa Clara, CA (US); Chang Siau, Saratoga, CA (US); Yosuke Kato, Yokohama (JP); Wanfang Tsai, Milpitas, CA (US); Shingo Zaitsu, Yokohama (JP)

(73) Assignee: SanDisk Technologies LLC, Plano, TX (US)

( * ) Notice: Subject to any disclaimer, the term of this patent is extended or adjusted under 35 U.S.C. 154(b) by 87 days.

(21) Appl. No.: 14/927,838

(22) Filed: Oct. 30, 2015

(65) Prior Publication Data

US 2016/0328321 A1 Nov. 10, 2016

Related U.S. Application Data

(60) Provisional application No. 62/159,121, filed on May 8, 2015, provisional application No. 62/159,101, filed on May 8, 2015.

(51) Int. Cl.
*G06F 12/00* (2006.01)
*G06F 12/0895* (2016.01)
(Continued)

(52) U.S. Cl.
CPC .......... *G06F 12/0895* (2013.01); *G06F 3/061* (2013.01); *G06F 3/0634* (2013.01);
(Continued)

(58) Field of Classification Search
CPC .... G06F 12/0895; G06F 3/061; G06F 3/0634; G06F 3/0647; G06F 3/0688;
(Continued)

(56) References Cited

U.S. PATENT DOCUMENTS 5,563,835 A 10/1996 Oldham
6,097,635 A 8/2000 Chang
(Continued)

FOREIGN PATENT DOCUMENTS

EP 0361561 A1 4/1990

OTHER PUBLICATIONS

International Search Report & The Written Opinion of the International Searching Authority dated Jul. 14, 2016, International Application No. PCT/US2016/029841.
(Continued)

*Primary Examiner* — Mark Giardino, Jr.
(74) *Attorney, Agent, or Firm* — Vierra Magen Marcus LLP

(57) ABSTRACT

Sensing techniques and associated circuitry are provided for use with a memory device. The techniques are suited for sensing operations involving even-numbered or odd-numbered bit lines. In one approach, the sensing circuitry includes left and right hand portions which have separate cache access lines, but are connected to a common output bus. A full data word can be output at a time by using a half word from the left hand portion and a half word from the right hand portion. Or, the sensing circuitry can be configured so that a full data word is output at a time from the left or right hand portion. One implementation provides an N-bit bus and N input paths for each of the left and right hand portions. Another implementation provides an N-bit bus and N/2 input paths for each of the left and right hand portions.

20 Claims, 33 Drawing Sheets

(51) Int. Cl.
*G06F 3/06* (2006.01)
*G06F 12/0897* (2016.01)
*G06F 12/0811* (2016.01)
*G06F 12/0817* (2016.01)
*G06F 13/00* (2006.01)
*G06F 13/28* (2006.01)

(52) U.S. Cl.
CPC .......... *G06F 3/0647* (2013.01); *G06F 3/0688* (2013.01); *G06F 12/0811* (2013.01); *G06F 12/0828* (2013.01); *G06F 12/0897* (2013.01); *G06F 2212/2022* (2013.01); *G06F 2212/283* (2013.01); *G06F 2212/60* (2013.01); *G06F 2212/621* (2013.01)

(58) Field of Classification Search
CPC ............. G06F 12/0897; G06F 12/0811; G06F 2212/2022; G06F 2212/60; G06F 2212/283
See application file for complete search history.

(56) References Cited

U.S. PATENT DOCUMENTS

| | | |
|---|---|---|
| 7,327,619 B2 | 2/2008 | Chan et al. |
| 7,817,476 B2 | 10/2010 | Cernea et al. |
| 8,331,146 B2 | 12/2012 | Fukuda |
| 8,995,210 B1 | 3/2015 | Hagspiel et al. |
| 9,053,810 B2 | 6/2015 | Dutta et al. |
| 2004/0202028 A1 | 10/2004 | Cioaca |
| 2010/0110788 A1 | 5/2010 | Bauer |
| 2013/0279251 A1 | 10/2013 | Lee |

OTHER PUBLICATIONS

International Search Report & The Written Opinion of the International Search Authority dated Jul. 14, 2016, International Application No. PCT/US2016/029844.

U.S. Appl. No. 14/928,454, filed Oct. 30, 2015.

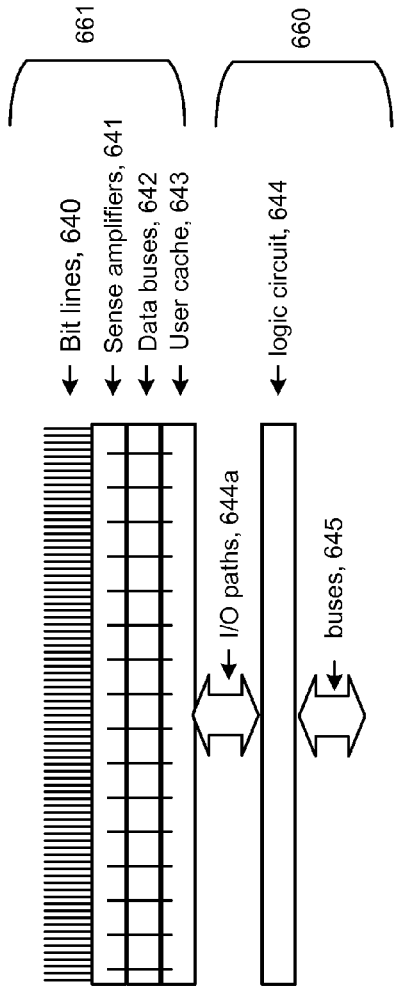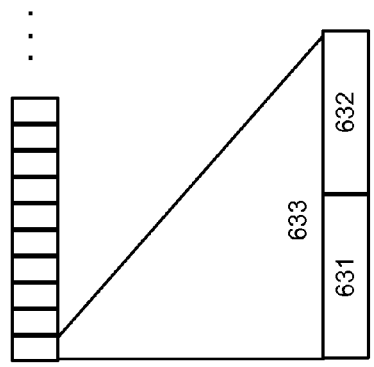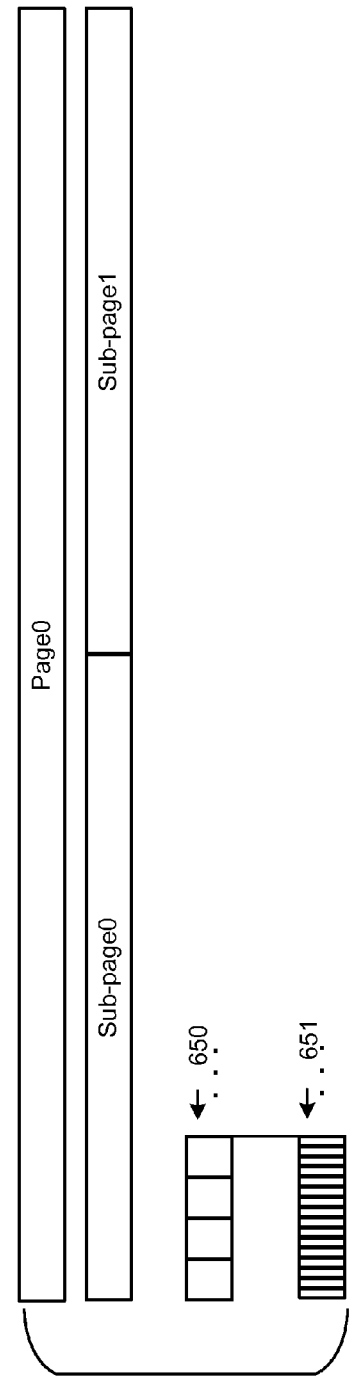

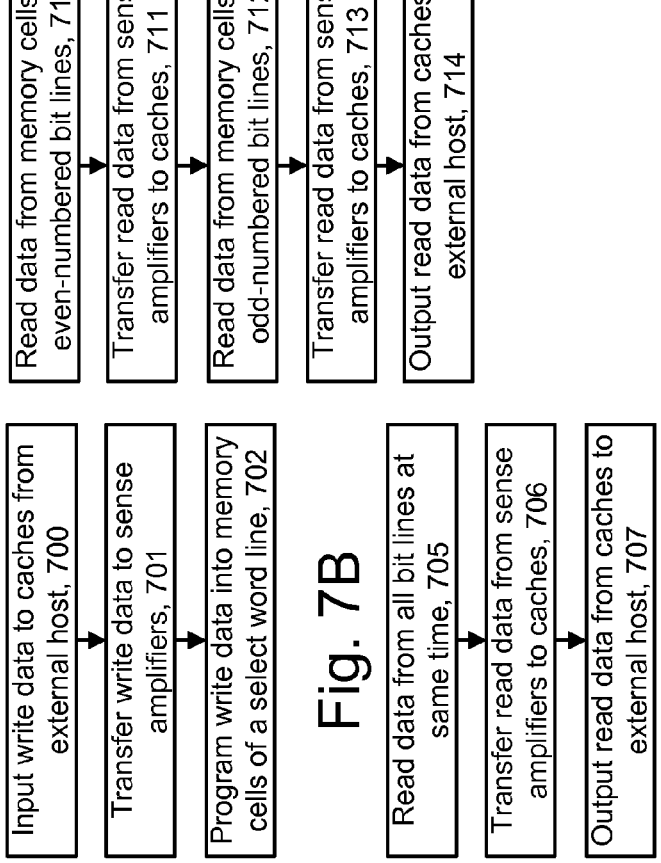

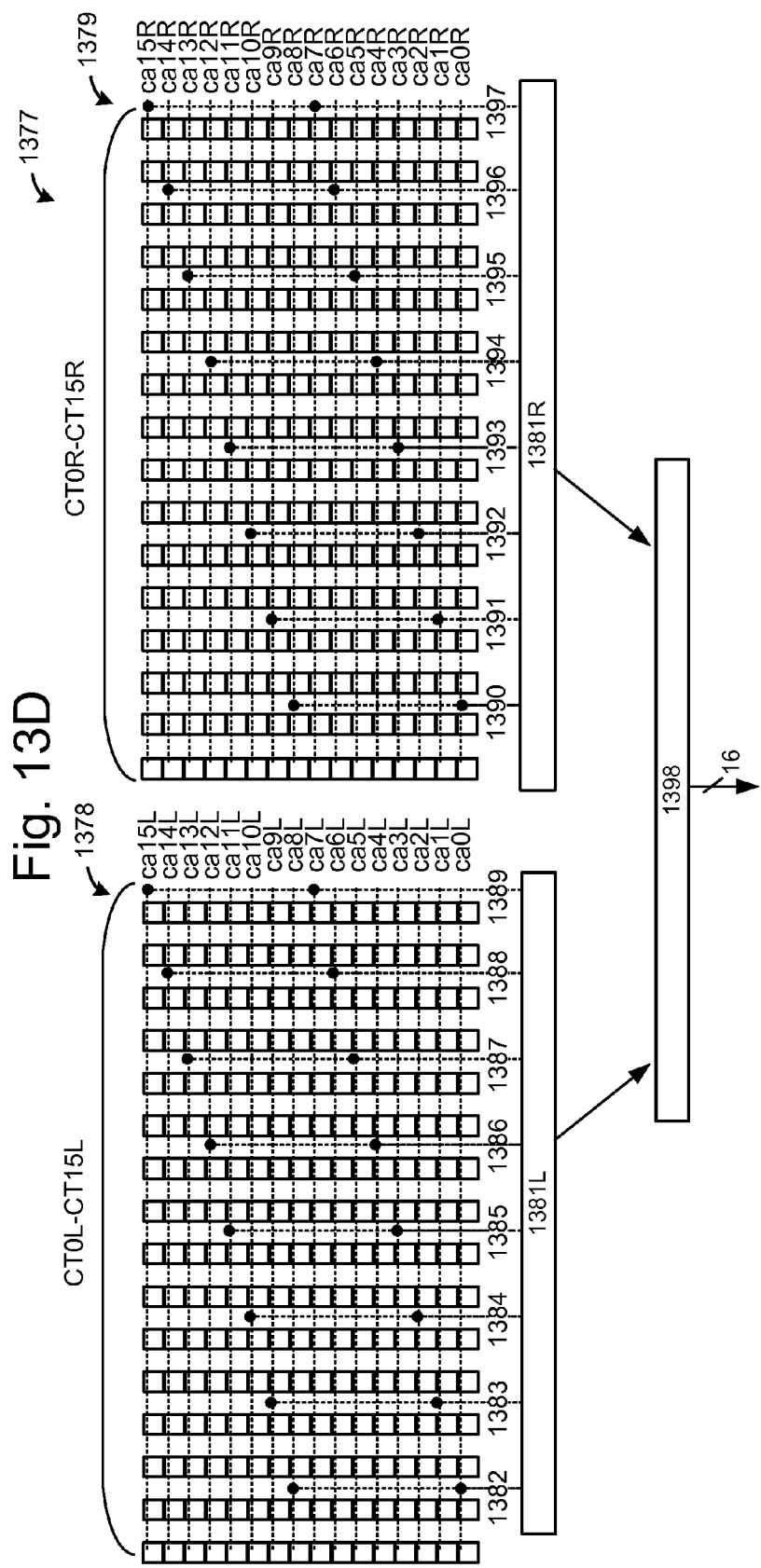

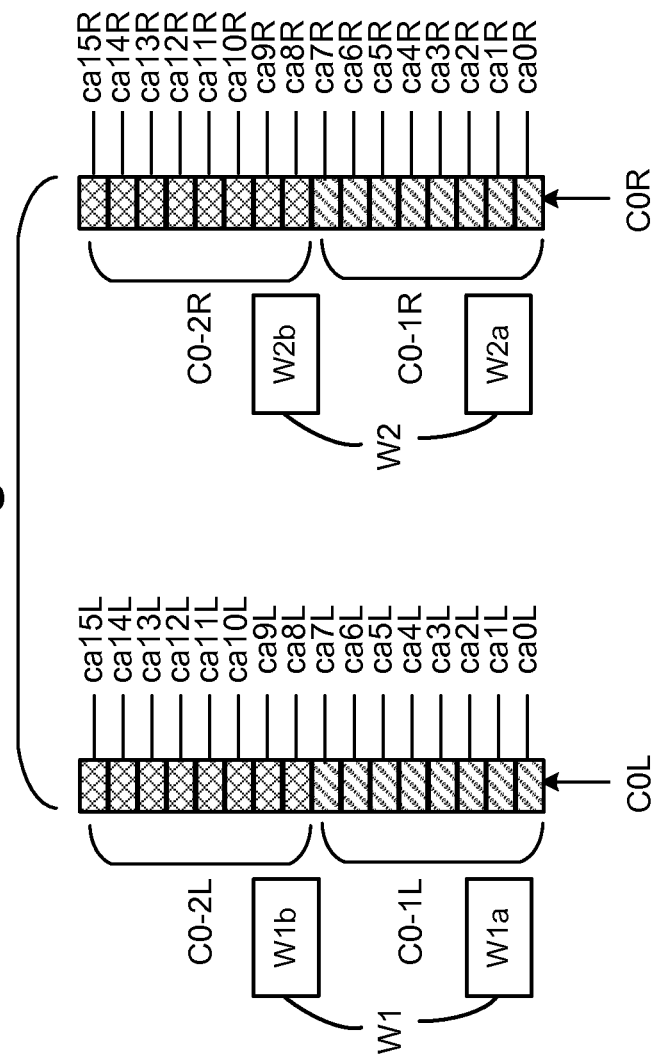

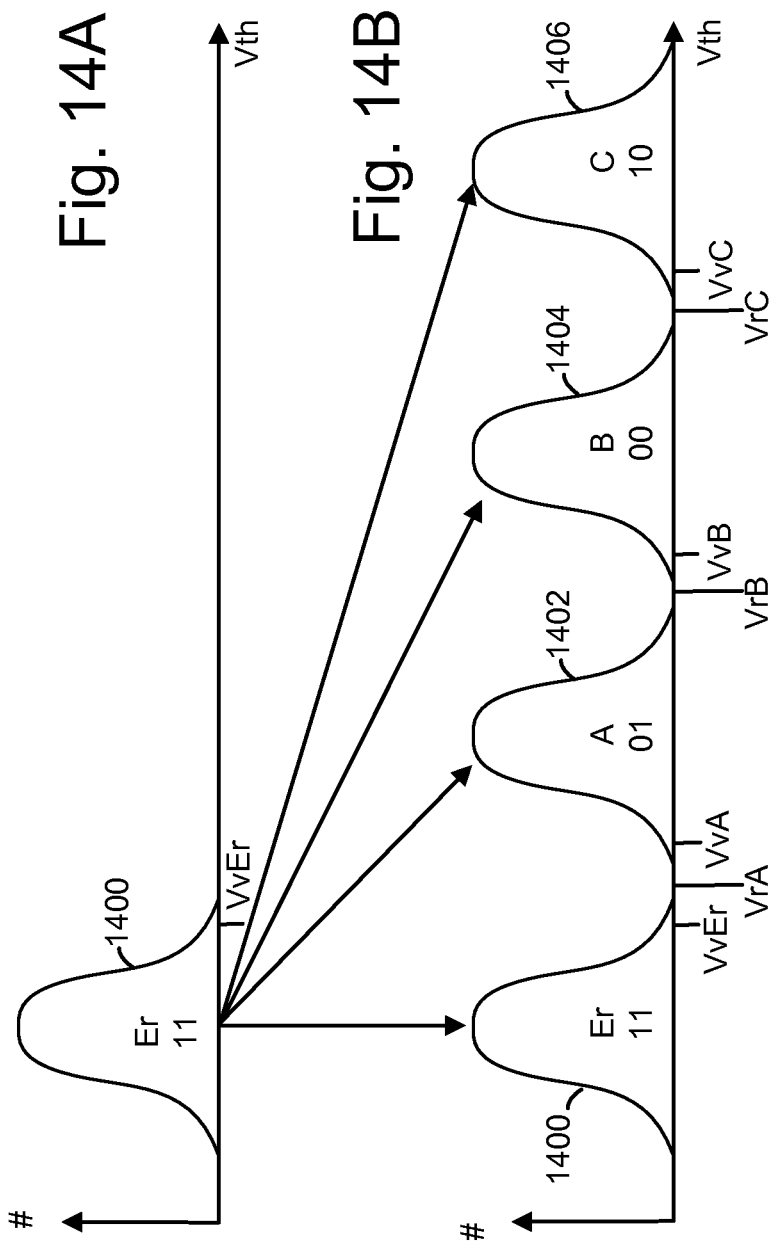

FAST READ FOR NON-VOLATILE STORAGE

CLAIM OF PRIORITY

The present application claims priority from U.S. Provisional Patent Application No. 62/159,101, entitled "Data Mapping For Non-Volatile Storage," by Zaitsu et al., filed May 8, 2015, and U.S. Provisional Patent Application No. 62/159,121, entitled "Fast Read For Non-Volatile Storage," by Balakrishnan et al., filed May 8, 2015, both of which are incorporated by reference herein in their entirety.

BACKGROUND

Semiconductor memory is widely used in various electronic devices such as cellular telephones, digital cameras, personal digital assistants, medical electronics, mobile computing devices, and non-mobile computing devices. Semiconductor memory may comprise non-volatile memory or volatile memory. A non-volatile memory allows information to be stored and retained even when the non-volatile memory is not connected to a source of power (e.g., a battery). Examples of non-volatile memory include flash memory (e.g., NAND-type and NOR-type flash memory) and Electrically Erasable Programmable Read-Only Memory (EEPROM).

A charge-storing material such as a floating gate or a charge-trapping material can be used in such memory devices to store a charge which represents a data state. The charge-trapping material can be arranged vertically in a three-dimensional (3D) stacked memory structure, or horizontally in a two-dimensional (2D) memory structure. One example of a 3D memory structure is the Bit Cost Scalable (BiCS) architecture which comprises a stack of alternating conductive and dielectric layers. A memory hole is formed in the stack and a NAND string is then formed by filling the memory hole with materials including a charge-trapping layer to create a vertical column of memory cells. A straight NAND string extends in one memory hole. Control gates of the memory cells are provided by the conductive layers.

However, various challenges are presented in operating such memory devices.

BRIEF DESCRIPTION OF THE DRAWINGS

Like-numbered elements refer to common components in the different figures.

FIG. 6B depicts an example arrangement of multiple sensing circuits such as the sensing circuit of FIG. 6A.

FIG. 6C depicts an example sensing circuit and input/output circuit consistent with FIG. 6B.

FIG. 6D depicts an example configuration of data which is input to and output from the sensing circuit of FIG. 6A.

FIG. 7A depicts an example programming process.

FIG. 7B depicts an example read process, where memory cells of all bit lines are read concurrently.

FIG. 7C depicts an example read process, where memory cells of even-numbered bit lines and odd-numbered bit lines are read separately.

FIG. 7D depicts an example programming process consistent with FIG. 7A in which data is transferred from caches to sense amplifiers within each of the cache tiers of the sensing circuit of FIG. 6A.

FIG. 13D depicts another example arrangement of a pair of the sensing circuits of FIG. 6A.

FIG. 13E depicts a set of caches in a left hand sensing portion and a right hand sensing portion, consistent with FIG. 13B-13D.

FIGS. 14A and 14B depict threshold voltage (Vth) distributions of memory cells in an example one-pass programming operation with four data states.

DETAILED DESCRIPTION

Sensing techniques and associated circuitry are provided for use with a memory device. The techniques are suited for use in programming and sensing operations involving even-numbered or odd-numbered bit lines.

Due to the scaling down of memory device dimensions, parasitic capacitance between bit lines can be a significant. Sensing accuracy is worsened due to coupling noise from neighbor bit lines and this may cause a read error. Increasing bit line settling time can compensate for the effects of this noise, but read performance is degraded due to the extra wait time.

An approach to cancel out the noise without a performance degradation involves sensing odd-numbered bit lines separately from even-numbered bit lines. Due to the reduced coupling, bit line settling time can be reduced compared to all bit line sensing to reduce overall read time. During sensing of a bit line, the two neighbor bit lines are inactive and act as shield bit lines. In this approach, a partial page of data is mapped to either even-numbered bit lines or odd-numbered bit lines. One approach to data mapping is to map user data (e.g., one word) to consecutive bit lines (BLs), e.g., 16 BLs, to have a better column repair efficiency.

The proposed technology provides a data mapping method for both shield bit line sensing (even-odd sensing) and conventional all bit line sensing. As a result, there is a backward compatibility with a mapping which is set by ROM fuses in the memory device.

In one approach, the mapping between caches and sense amplifiers in a sensing circuit is modified by using dual data buses. One bus is used for same-tier transfers and the other is used for cross-tier transfers. Each tier comprises a set of sense amplifiers and a corresponding set of caches. This approach does not require a modification of the input/output path which is connected to the sensing circuitry.

In another approach, the sensing circuitry includes left and right hand portions which have separate cache access lines, but are connected to a common output bus. A full data word can be output at a time by using a half word from the left hand portion and a half word from the right hand portion. Or, the sensing circuitry can be configured so that a full data word is output at a time from the left or right hand portion. One implementation provides N input paths for each of the left and right hand portions. Another implementation provides N/2 input paths for each of the left and right hand portions. The input paths are for an N-bit bus.

The two approaches can be combined as well. For example, the dual data bus circuit can used in each of the left and right hand portions which have separate cache access lines. This allows sensing one in four bit lines while still outputting a full page at a time The following discussion provides details of one example of a suitable structure for a memory devices that can implement the proposed technology.

Figure 1:
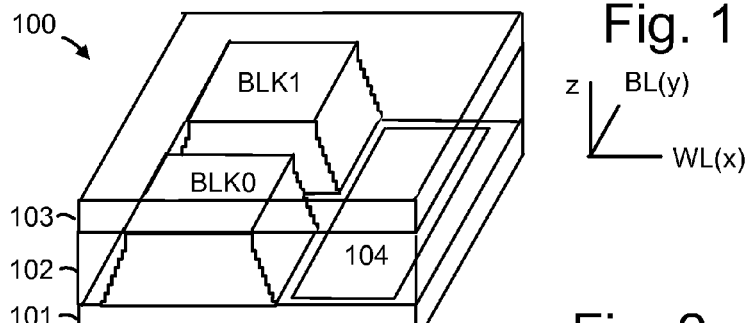
FIG. 1 is a perspective view of a 3D stacked non-volatile memory device.

FIG. 1 is a perspective view of a three dimensional (3D) stacked non-volatile memory device. The memory device 100 includes a substrate 101. On and above the substrate are example blocks BLK0 and BLK1 of memory cells (non-volatile storage elements). Also on substrate 101 is peripheral area 104 with support circuits for use by the blocks. Substrate 101 can also carry circuits under the blocks, along with one or more lower metal layers which are patterned in conductive paths to carry signals of the circuits. The blocks are formed in an intermediate region 102 of the memory device. In an upper region 103 of the memory device, one or more upper metal layers are patterned in conductive paths to carry signals of the circuits. Each block comprises a stacked area of memory cells, where alternating levels of the stack represent word lines. While two blocks are depicted as an example, additional blocks can be used, extending in the x- and/or y-directions.

In one example implementation, the length of the plane in the x-direction, represents a direction in which signal paths for word lines extend (a word line or SGD line direction), and the width of the plane in the y-direction, represents a direction in which signal paths for bit lines extend (a bit line direction). The z-direction represents a height of the memory device.

Figure 2:
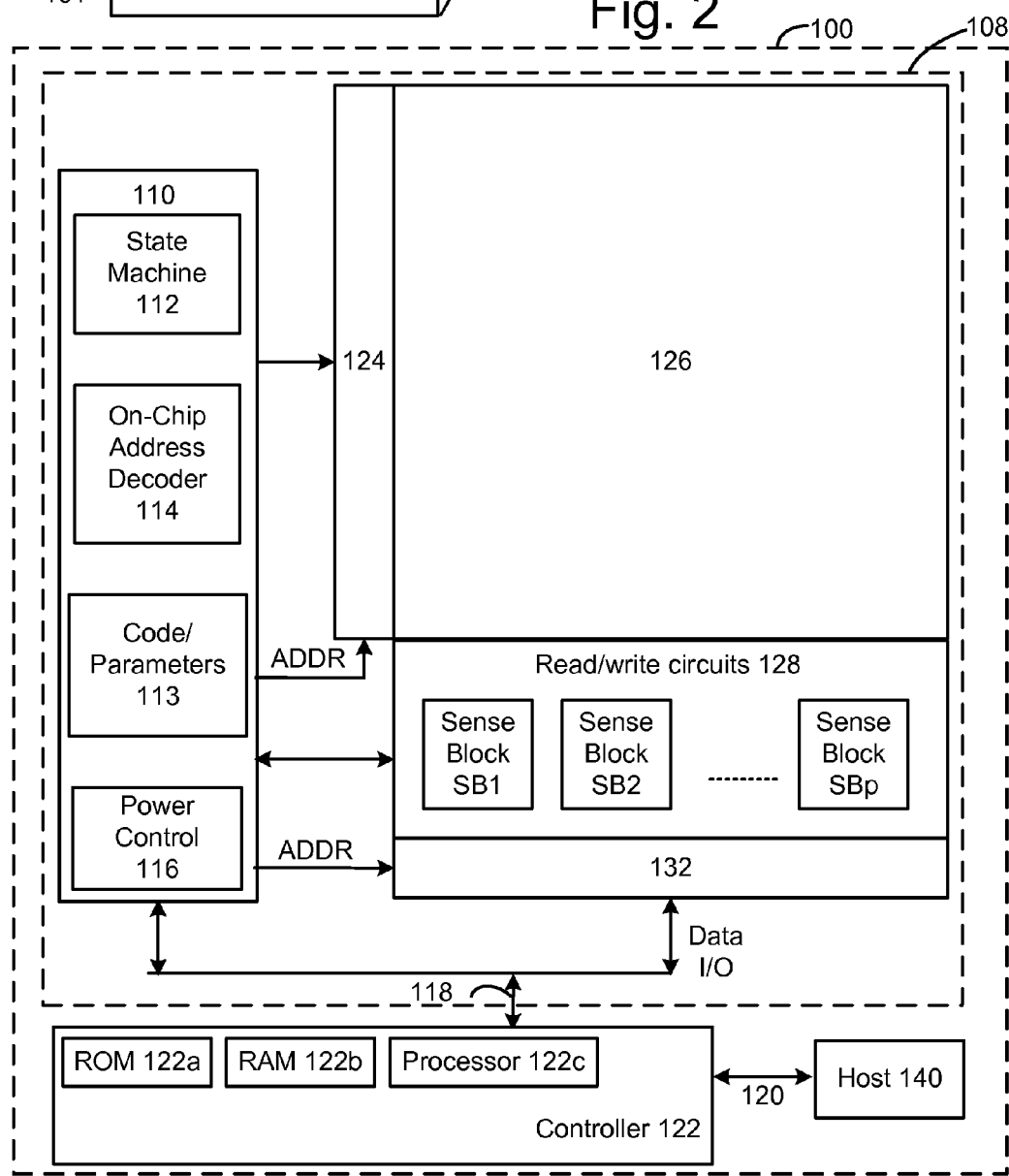
FIG. 2 is a functional block diagram of a memory device such as the 3D stacked non-volatile memory device 100 of FIG. 1.

FIG. 2 is a functional block diagram of an example memory device such as the 3D stacked non-volatile memory device 100 of FIG. 1. Memory device 100 includes one or more memory die 108. Each memory die 108 includes a three dimensional memory structure 126 of memory cells (such as, for example, a 3D array of memory cells), control circuitry 110, and read/write circuits 128. The memory structure 126 is addressable by word lines via a row decoder 124 and by bit lines via a column decoder 132. The read/write circuits 128 include multiple sense blocks SB1, SB2, . . . , SBp (sensing circuitry) and allow a page of memory cells to be read or programmed in parallel. In some systems, a controller 122 is included in the same memory device 100 (e.g., a removable storage card) as the one or more memory die 108. However, in other systems, the controller can be separated from the memory die 108. In some embodiments, one controller 122 will communicate with multiple memory die 108. In other embodiments, each memory die 108 has its own controller. Commands and data are transferred between the host 140 and controller 122 via a data bus 120, and between controller 122 and the one or more memory die 108 via lines 118. In one embodiment, memory die 108 includes a set of input and/or output (I/O) pins that connect to lines 118.

Memory structure 126 may comprise one or more arrays of memory cells including a 3D array. The memory structure may comprise a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Control circuitry 110 cooperates with the read/write circuits 128 to perform memory operations (e.g., erase, program, read, and others) on memory structure 126, and includes a state machine 112, an on-chip address decoder 114, and a power control module 116. The state machine 112 provides chip-level control of memory operations. Code and parameter storage 113 may be provided for storing operational parameters and software. In one embodiment, state machine 112 is programmable by the software stored in code and parameter storage 113. In other embodiments, state machine 112 does not use software and is completely implemented in hardware (e.g., electronic circuits).

The on-chip address decoder 114 provides an address interface between addresses used by host 140 or memory controller 122 to the hardware address used by the decoders 124 and 132. Power control module 116 controls the power and voltages supplied to the word lines and bit lines during memory operations. It can include drivers for word line layers (discussed below) in a 3D configuration, select transistors (e.g., SGS and SGD transistors, described below) and source lines. Power control module 116 may include charge pumps for creating voltages. The sense blocks include bit line drivers. An SGS transistor is a select gate transistor at a source end of a NAND string, and an SGD transistor is a select gate transistor at a drain end of a NAND string.

Any one or any combination of control circuitry 110, state machine 112, decoders 114/124/132, storage 113, power control module 116, sense blocks SB1, SB2, . . . , SBp, read/write circuits 128, and controller 122 can be considered a managing circuit or a control circuit that performs the functions described herein.

The (on-chip or off-chip) controller 122 may comprise a processor 122c and storage devices (memory) such as ROM 122a and RAM 122b. The storage devices comprises code such as a set of instructions, and the processor 122c is operable to execute the set of instructions to provide the functionality described herein. Alternatively or additionally, processor 122c can access code from a storage device in the memory structure, such as a reserved area of memory cells connected to one or more word lines.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors.

A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

A three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

The techniques provided herein can be used with 2D or 3D memory.

A person of ordinary skill in the art will recognize that this technology is not limited to a single specific memory structure, but covers many relevant memory structures within the spirit and scope of the technology as described herein and as understood by one of ordinary skill in the art.

Figure 3A:
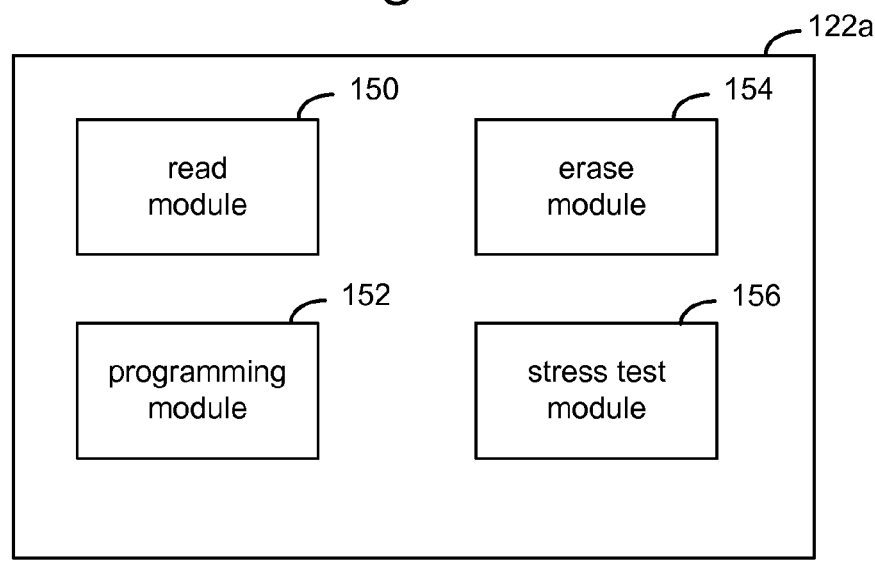
FIG. 3A is a block diagram depicting software modules for programming one or more processors in a controller.

FIG. 3A is a block diagram depicting software modules for programming one or more processors in controller 122. FIG. 3A depicts read module 150, programming module 152, erase module 154 and stress test module 156 being stored in ROM 122a. These software modules can also be stored in RAM or memory die 108. Read module 150 includes software that programs processor(s) 122C to perform read operations. Programming module 152 includes software that programs processor(s) 122C to perform programming operations. Erase module 154 includes software that programs processor(s) 122C to perform erase operations. Stress test module 156 includes software that programs processor(s) 122C to perform stress operations and testing operations, as described herein (see FIGS. 8-10). Based on the software, controller 122 instructs memory die 108 to perform memory operations.

Figure 3B:
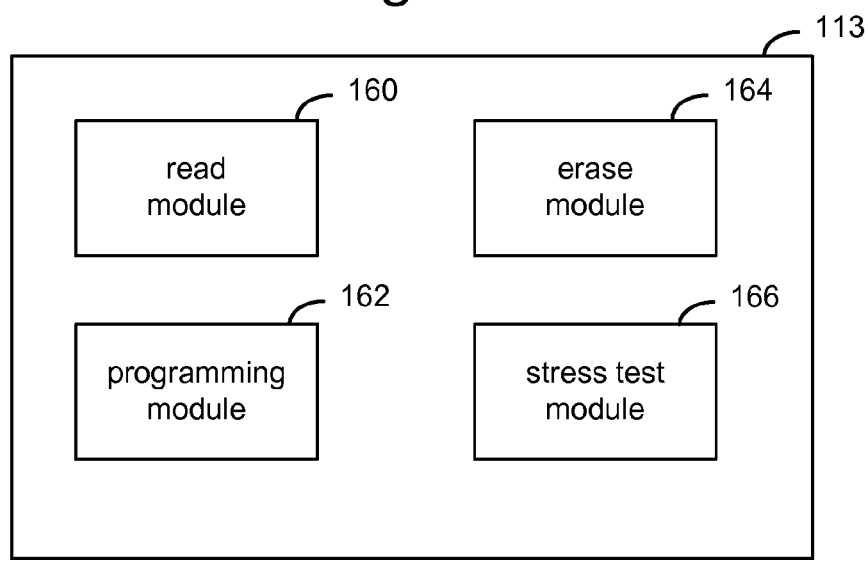
FIG. 3B is a block diagram depicting software modules for programming a state machine or other processor on a memory die.

FIG. 3B is a block diagram depicting software modules for programming state machine 112 (or other processor on memory die 108). FIG. 3B depicts read module 160, programming module 162, erase module 164 and stress test module 166 being stored in code and parameter storage 113. These software modules can also be stored in RAM or in memory structure 126. Read module 160 includes software that programs state machine 112 to perform read operations. Programming module 152 includes software that programs state machine 112 to perform programming operations. Erase module 154 includes software that programs state machine 112 to perform erase operations. Stress test module 156 includes software that programs state machine 112 to perform stress operations and testing operations, as described herein (see FIGS. 8-10). Alternatively, state machine 112 (which is an electronic circuit) can be hard wired so that no software is needed.

Figure 4A:
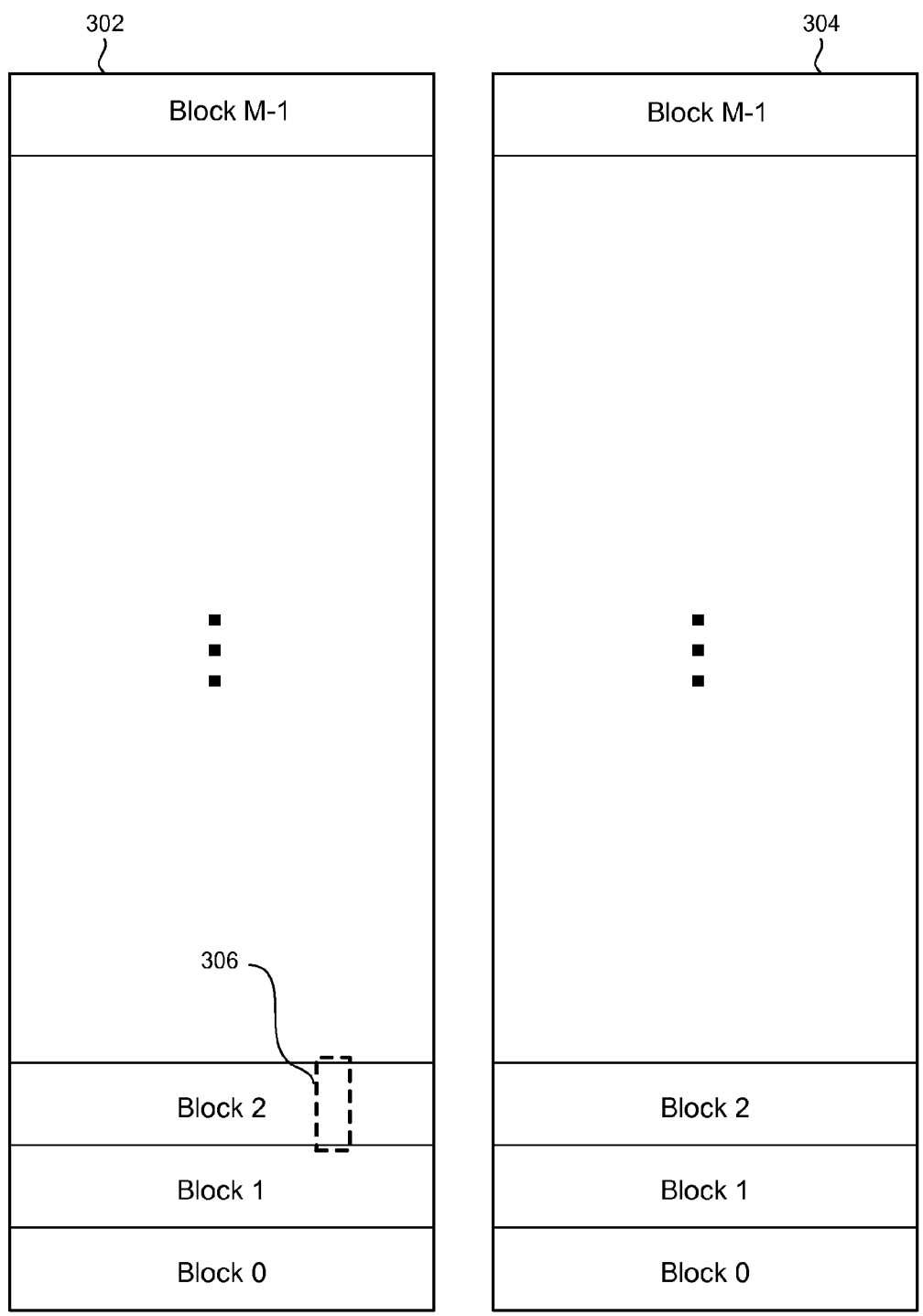
FIG. 4A is a block diagram of a memory structure having two planes.

FIG. 4A is a block diagram explaining one example organization of memory structure 126, which is divided into two planes 302 and 304. Each plane is then divided into M blocks. In one example, each plane has about 2000 blocks. However, different numbers of blocks and planes can also be used.

Figure 4B:
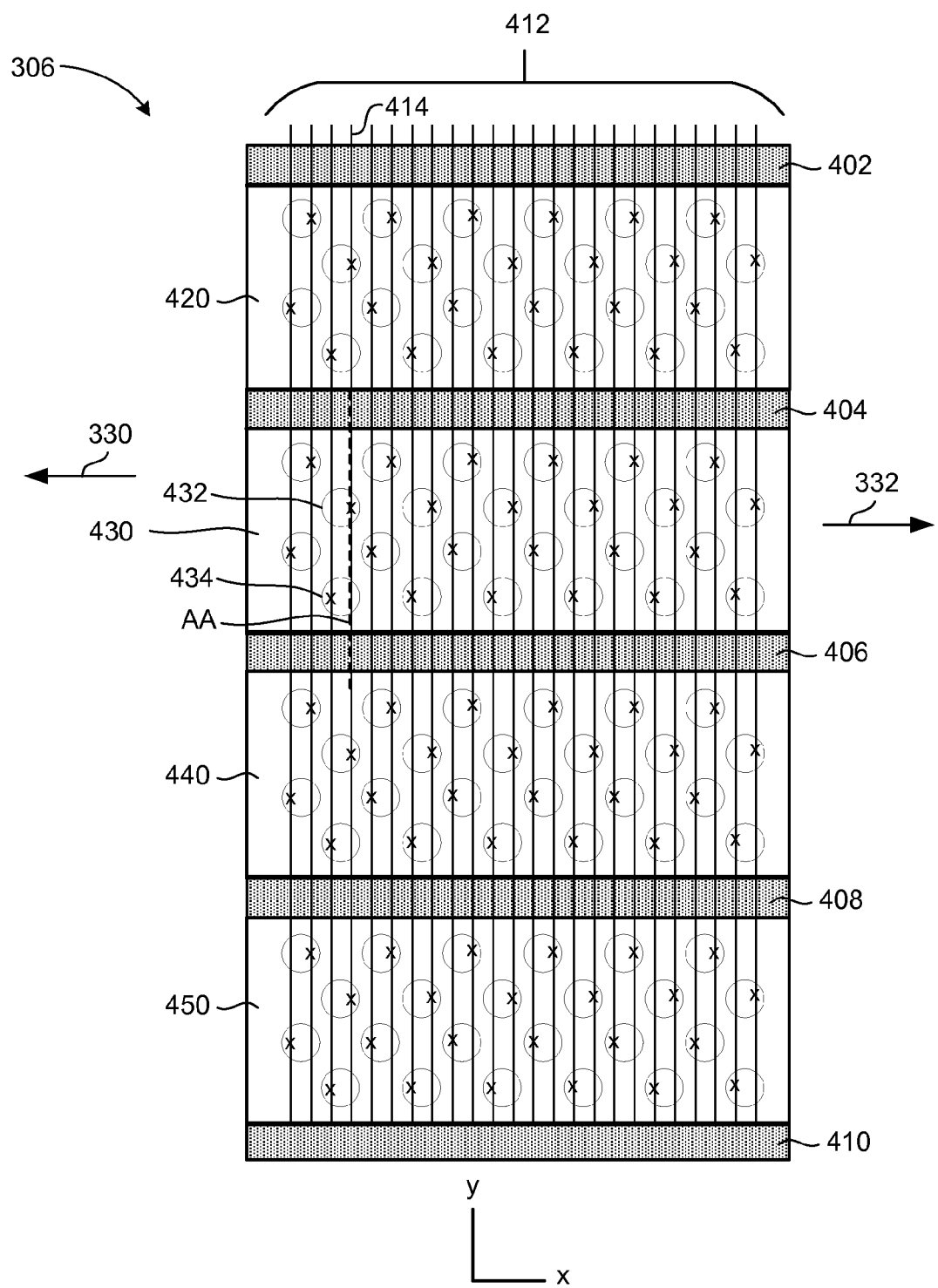
FIG. 4B depicts a top view of a portion of a block of memory cells.

FIG. 4B is a block diagram depicting a top view of a portion of one block from memory structure 126. The portion of the block depicted in FIG. 4B corresponds to portion 306 in block 2 of FIG. 4A. As can be seen from FIG. 4B, the block depicted in FIG. 4B extends in the direction of arrow 330 and in the direction of arrow 332. In one embodiment, the memory array will have 48 layers. Other embodiments have less than or more than 48 layers. However, FIG. 4B only shows the top layer.

FIG. 4B depicts a plurality of circles that represent the vertical columns. Each of the vertical columns include multiple select transistors and multiple memory cells. In one embodiment, each vertical column implements a NAND string. More details of the vertical columns are provided below. Since the block depicted in FIG. 4B extends in the direction of arrow 330 and in the direction of arrow 332, the block includes more vertical columns than depicted in FIG. 4B FIG. 4B also depicts a set of bit lines 412. FIG. 4B shows twenty four bit lines because only a portion of the block is depicted. It is contemplated that more than twenty four bit lines connected to vertical columns of the block. Each of the circles representing vertical columns has an "x" to indicate its connection to one bit line.

The block depicted in FIG. 4B includes a set of local interconnects 402, 404, 406, 408 and 410 that connect the various layers to a source line below the vertical columns. Local interconnects 402, 404, 406, 408 and 410 also serve to divide each layer of the block into four regions; for example, the top layer depicted in FIG. 4B is divided into regions 420, 430, 440 and 450. In the layers of the block that implement memory cells, the four regions are referred to as word line fingers that are separated by the local interconnects. In one embodiment, the word line fingers on a common level of a block connect together at the end of the block to form a single word line. In another embodiment, the word line fingers on the same level are not connected together. In one example implementation, a bit line only connects to one vertical column in each of regions 420, 430, 440 and 450. In that implementation, each block has sixteen rows of active columns and each bit line connects to four rows in each block. In one embodiment, all of four rows connected to a common bit line are connected to the same word line (via different word line fingers on the same level that are connected together); therefore, the system uses the source side select lines and the drain side select lines to choose one (or another subset) of the four to be subjected to a memory operation (program, verify, read, and/or erase).

Although FIG. 4B shows each region having four rows of vertical columns, four regions and sixteen rows of vertical columns in a block, those exact numbers are an example implementation. Other embodiments may include more or less regions per block, more or less rows of vertical columns per region and more or less rows of vertical columns per block.

FIG. 4B also shows the vertical columns being staggered. In other embodiments, different patterns of staggering can be used. In some embodiments, the vertical columns are not staggered.

Figure 4C:
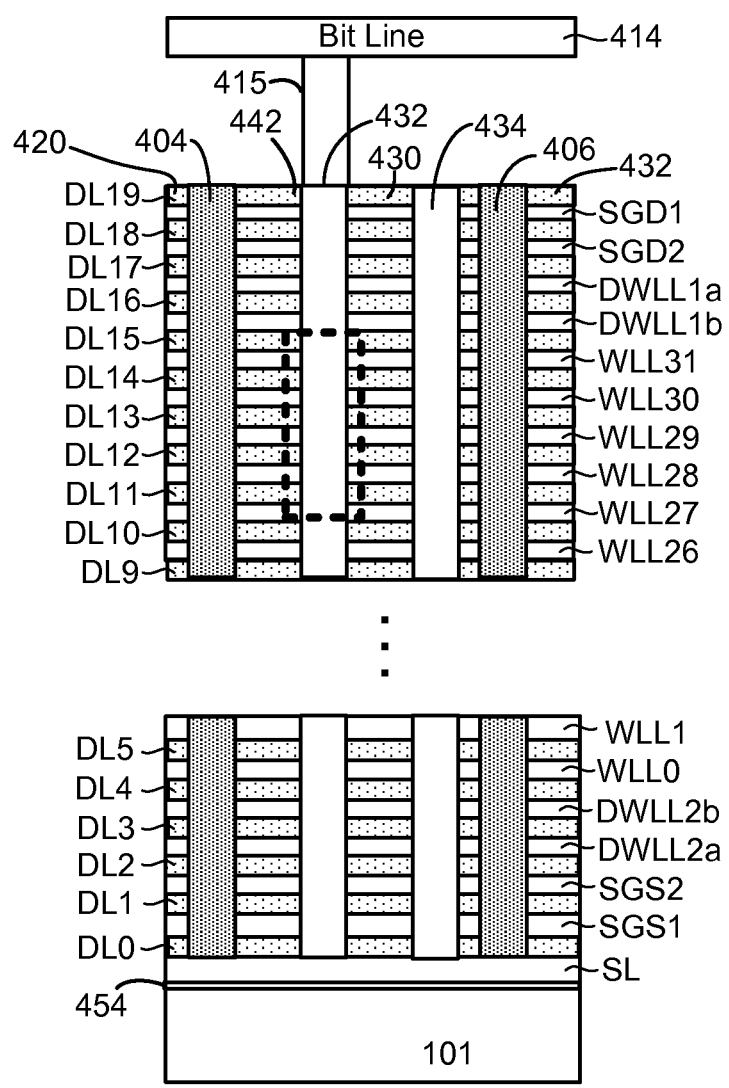
FIG. 4C depicts a cross sectional view of a portion of a block of memory cells.

FIG. 4C depicts a portion of an embodiment of three dimensional memory structure 126 showing a cross-sectional view along line AA of FIG. 4B. This cross sectional view cuts through vertical columns 432 and 434 and region 430 (see FIG. 4B). The structure of FIG. 4C includes two drain side select layers SGD1 and SGD1; two source side select layers SGS1 and SGS2; four dummy word line layers DWLL1a, DWLL1b, DWLL2a and DWLL2b; and thirty two word line layers WLL0-WLL31 for connecting to data memory cells. Other embodiments can implement more or less than two drain side select layers, more or less than two source side select layers, more or less than four dummy word line layers, and more or less than thirty two word line layers. Vertical columns 432 and 434 are depicted protruding through the drain side select layers, source side select layers, dummy word line layers and word line layers. In one embodiment, each vertical column comprises a NAND string. Below the vertical columns and the layers listed below is substrate 101, an insulating film 454 on the substrate, and source line SL. The NAND string of vertical column 432 has a source end at a bottom of the stack and a drain end at a top of the stack. As in agreement with FIG. 4B, FIG. 4C show vertical column 432 connected to Bit Line 414 via connector 415. Local interconnects 404 and 406 are also depicted.

For ease of reference, drain side select layers SGD1 and SGD1; source side select layers SGS1 and SGS2; dummy word line layers DWLL1a, DWLL1b, DWLL2a and DWLL2b; and word line layers WLL0-WLL31 collectively are referred to as the conductive layers or control gate layers. In one embodiment, the conductive layers are made from a combination of TiN and Tungsten. In other embodiments, other materials can be used to form the conductive layers, such as doped polysilicon, metal such as Tungsten or metal silicide. In some embodiments, different conductive layers can be formed from different materials. Between conductive layers are dielectric layers DL0-DL19. For example, dielectric layers DL10 is above word line layer WLL26 and below word line layer WLL27. In one embodiment, the dielectric layers are made from $SiO_2$. In other embodiments, other dielectric materials can be used to form the dielectric layers.

The memory cells are formed along vertical columns which extend through alternating conductive and dielectric layers in the stack. In one embodiment, the memory cells are arranged in NAND strings. The word line layer WLL0-WLL31 connect to memory cells (also called data memory cells). Dummy word line layers DWLL1a, DWLL1b, DWLL2a and DWLL2b connect to dummy memory cells. A dummy memory cell, also referred to as a non-data memory cell, does not store user data, while a data memory cell is eligible to store user data. Thus, data memory cells may be programmed. Drain side select layers SGD1 and SGD1 are used to electrically connect and disconnect NAND strings from bit lines. Source side select layers SGS1 and SGS2 are used to electrically connect and disconnect NAND strings from the source line SL.

Figure 4D:
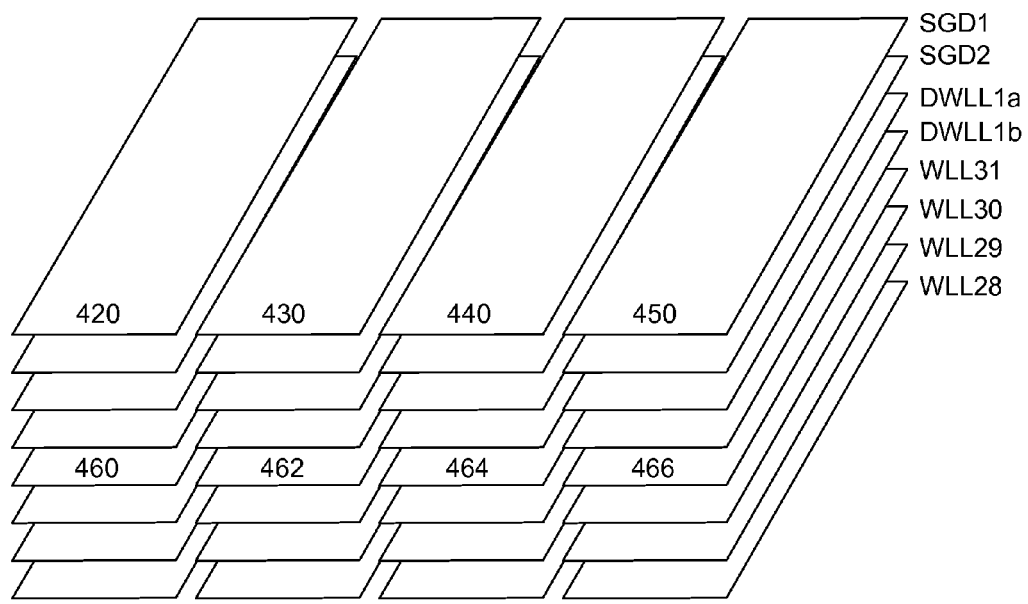
FIG. 4D depicts a view of the select gate layers and word line layers.
Figure 4D:
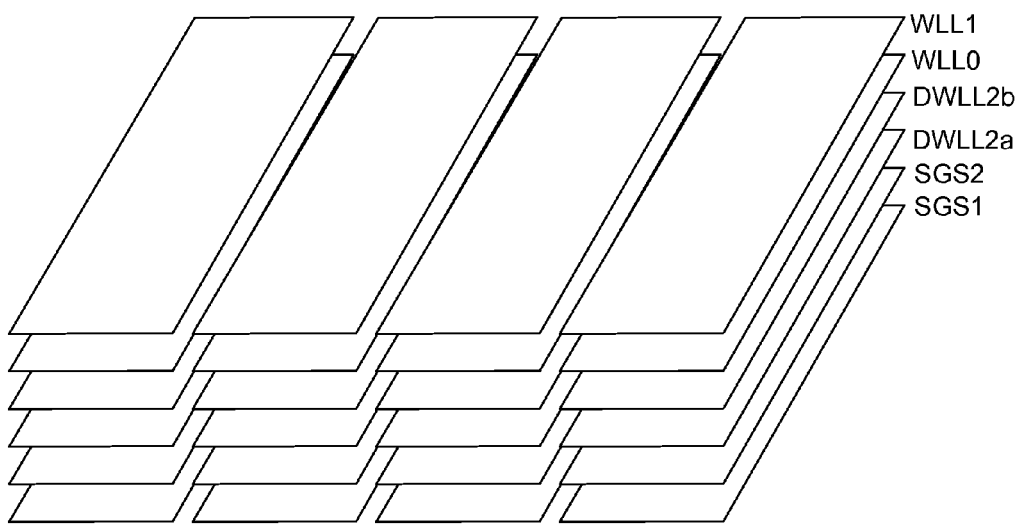

FIG. 4D depicts a perspective view of the conductive layers (SGD1, SGD1, SGS1, SGS2; DWLL1a, DWLL1b, DWLL2a, DWLL2b, and WLL0-WLL31) for the block that is partially depicted in FIG. 4C. As mentioned above with respect to FIG. 4B, local interconnects 402, 404, 406, 408 and 410 break up each conductive layers into four regions. For example, drain side select gate layer SGD1 (the top layer) is divided into regions 420, 430, 440 and 450. Similarly, word line layer WLL31 is divided into regions 460, 462, 464 and 466. For word line layers (WLL0-WLL-31), the regions are referred to as word line fingers; for example, word line layer WLL31 is divided into word line fingers 460, 462, 464 and 466.

Figure 4E:
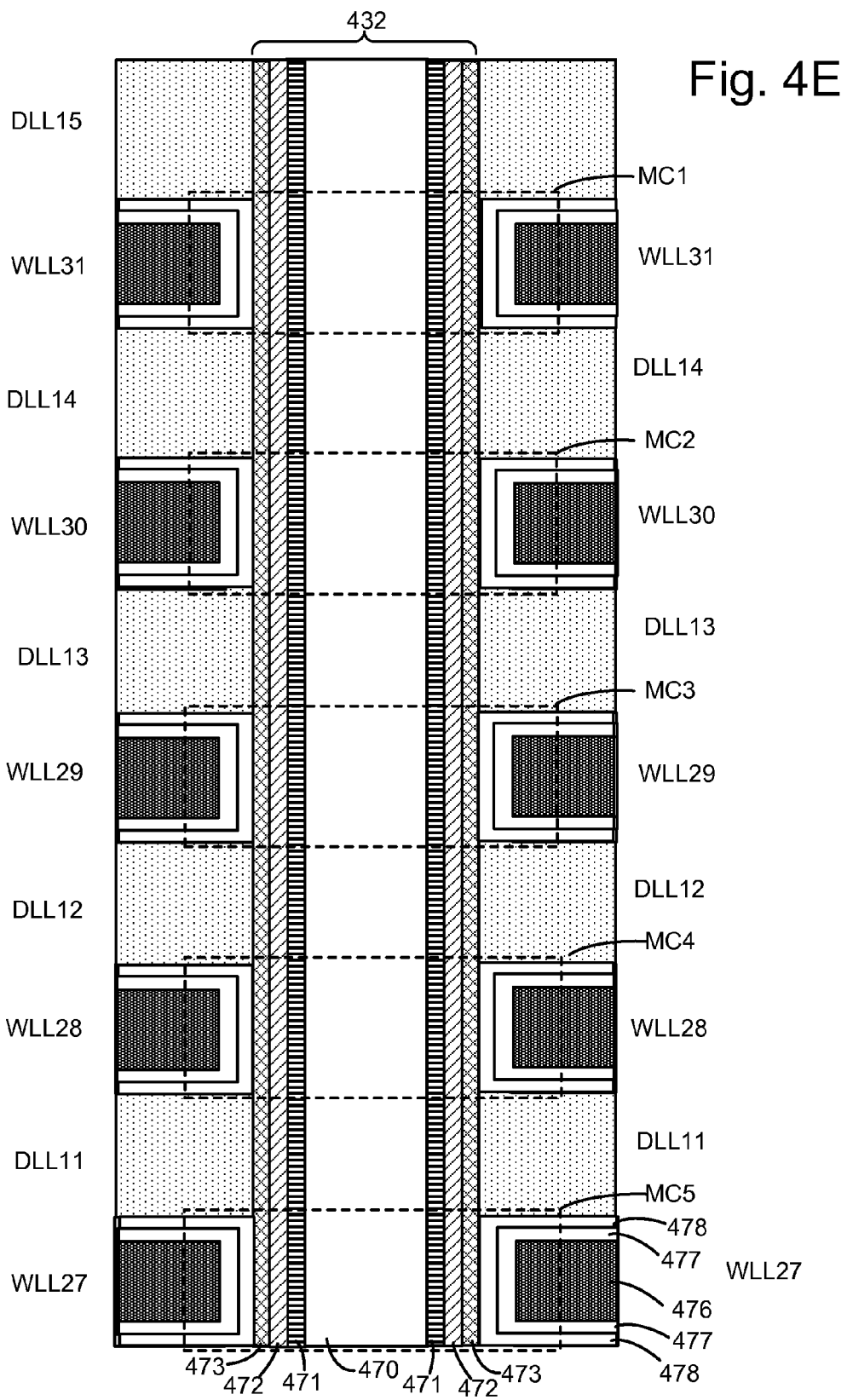
FIG. 4E is a cross sectional view of a vertical column of memory cells.

FIG. 4E is a cross sectional view of a vertical column of memory cells. FIG. 4E depicts a cross sectional view of region 442 of FIG. 4C that includes a portion of vertical column 432. In one embodiment, the vertical columns are round and include four layers; however, in other embodiments more or less than four layers can be included and other shapes can be used. In one embodiment, vertical column 432 includes an inner core layer 470 that is made of a dielectric, such as $SiO_2$. Other materials can also be used. Surrounding inner core 470 is polysilicon channel 471. Materials other than polysilicon can also be used. Note that it is the channel 471 that connects to the bit line. Surrounding channel 471 is a tunneling dielectric 472. In one embodiment, tunneling dielectric 472 has an ONO structure. Surrounding tunneling dielectric 472 is charge trapping layer 473, such as (for example) a specially formulated silicon nitride that increases trap density.

FIG. 4E depicts dielectric layers DLL11, DLL12, DLL13, DLL14 and DLL15, as well as word line layers WLL27, WLL28, WLL29, WLL30, and WLL31. Each of the word line layers includes a word line region 476 surrounded by an aluminum oxide layer 477, which is surrounded by a blocking oxide ($SiO_2$) layer 478. The physical interaction of the word line layers with the vertical column forms the memory cells. Thus, a memory cell comprises channel 471, tunneling dielectric 472, charge trapping layer 473, blocking oxide layer 478, aluminum oxide layer 477 and word line region 476. For example, word line layer WLL31 and a portion of vertical column 432 comprise a memory cell MC1. Word line layer WLL30 and a portion of vertical column 432 comprise a memory cell MC2. Word line layer WLL29 and a portion of vertical column 432 comprise a memory cell MC3. Word line layer WLL28 and a portion of vertical column 432 comprise a memory cell MC4. Word line layer WLL27 and a portion of vertical column 432 comprise a memory cell MC5.

When a memory cell is programmed, electrons are stored in a portion of the charge trapping layer 473 which is associated with the memory cell. These electrons are drawn into the charge trapping layer 473 from the channel 471, through the tunneling layer 473, in response to an appropriate voltage on word line region 476. The threshold voltage (Vth) of a memory cell is increased in proportion to the amount of stored charge. During an erase operation, the electrons return to the channel.

Figure 5A:
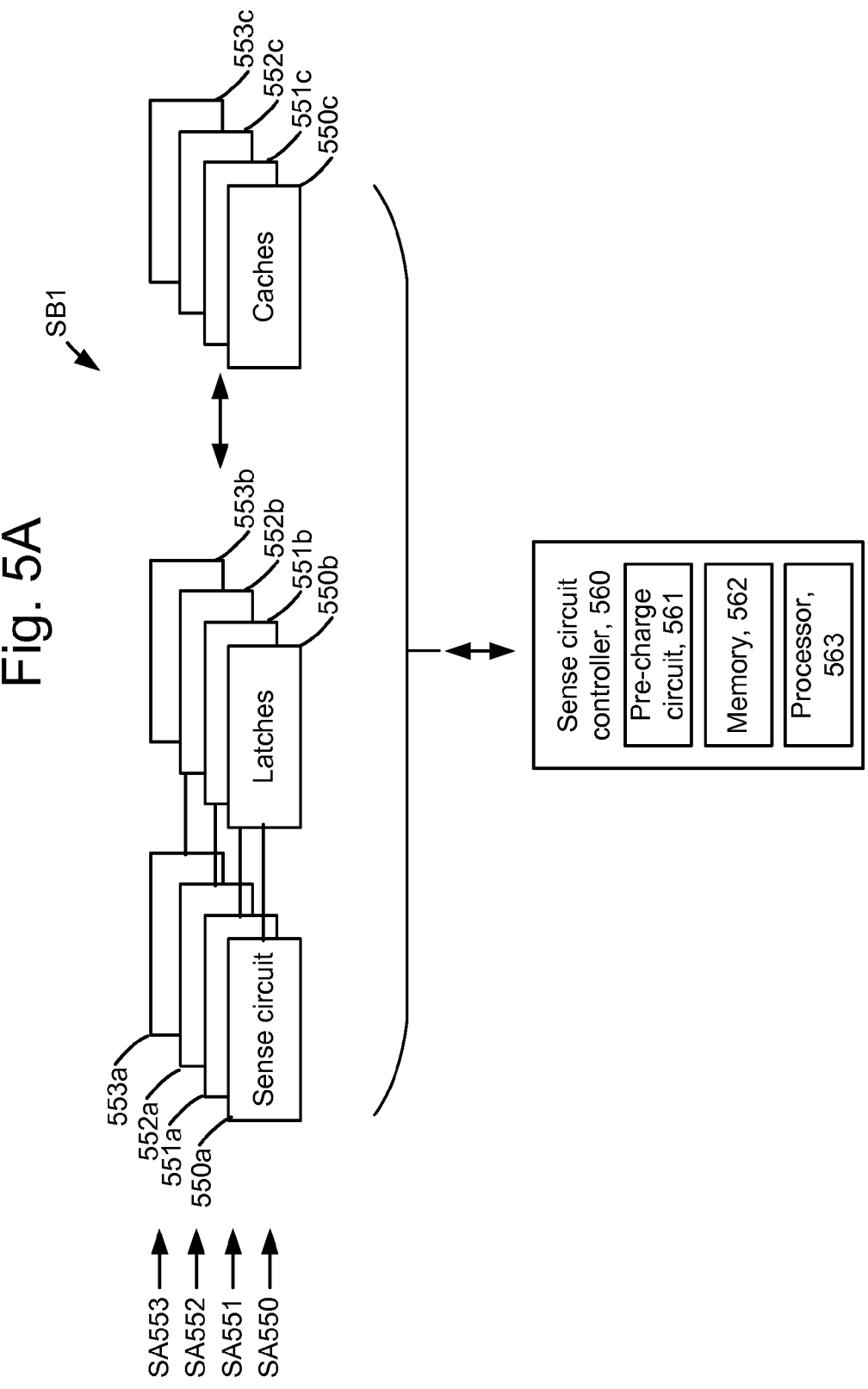
FIG. 5A depicts an example block diagram of the sense block SB1 of FIG. 1.

FIG. 5A depicts an example block diagram of the sense block SB1 of FIG. 1. In one approach, a sense block comprises multiple sense circuits. Each sense circuit is associated with data latches and caches. For example, the example sense circuits 550a, 551a, 552a and 553a are associated with the data latches 550b, 551b, 552b and 553b, respectively, and with caches 550c, 551c, 552c and 553c, respectively. A sense amplifier may be considered to include one of the sense circuits and the corresponding set of latches. For example, a sense amplifier SA550 includes the sense circuit 550a and the set of latches 550b, a sense amplifier SA551 includes the sense circuit 551a and the set of latches 551b, a sense amplifier SA552 includes the sense circuit 552a and the set of latches 552b, and a sense amplifier SA553 includes the sense circuit 553a and the set of latches 553b.

In one approach, different subsets of bit lines can be sensed using different respective sense blocks. This allows the processing load which is associated with the sense circuits to be divided up and handled by a respective processor in each sense block. For example, a sense circuit controller 560 in SB1 can communicate with the set of sense circuits and latches. The sense circuit controller may include a pre-charge circuit 561 which provides a voltage to each sense circuit for setting a pre-charge voltage. In one possible approach, the voltage is provided to each sense circuit independently, e.g., via the data bas 503 and a local bus such as LBUS1 or LBUS2 in FIG. 5B. In another possible approach, a common voltage is provided to each sense circuit concurrently, e.g., via the line 505 in FIG. 5B. The sense circuit controller may also include a memory 562 and a processor 563. Further example details of the sense circuit controller and the sense circuits 550a and 551a are provided below.

Figure 5B:
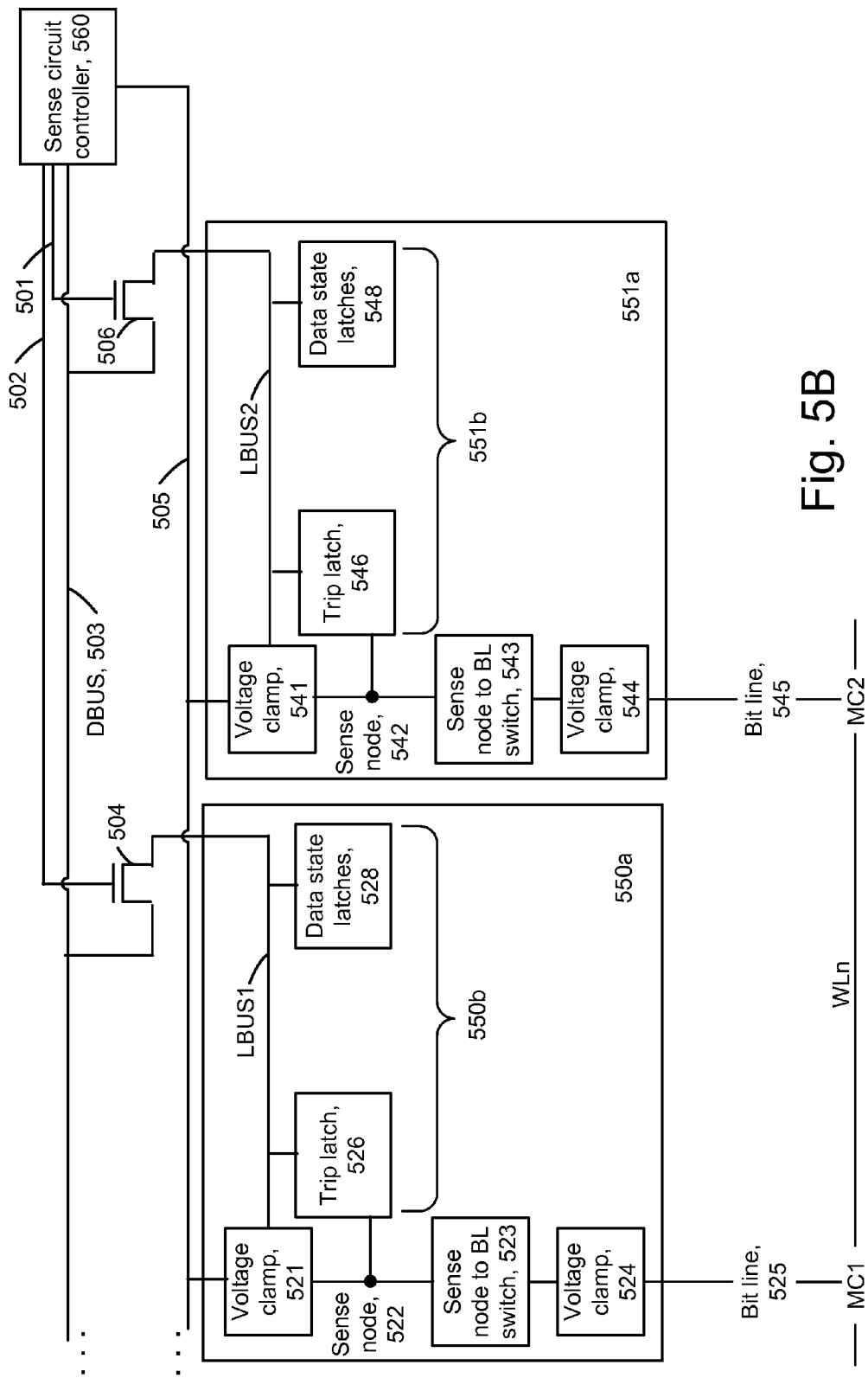
FIG. 5B depicts another example block diagram of the sense block SB1 of FIG. 1.

FIG. 5B depicts another example block diagram of the sense block SB 1 of FIG. 1. The sense circuit controller 560 communicates with multiple sense circuits including example sense circuits 550a and 551a, also shown in FIG. 5A. The sense circuit 550a includes latches 550b, including a trip latch 526, and data state latches 528. The sense circuit further includes a voltage clamp 521 such as a transistor which sets a pre-charge voltage at a sense node 522. A sense node to bit line (BL) switch 523 selectively allows the sense node to communicate with a bit line 525, e.g., the sense node is electrically connected to the bit line so that the sense node voltage can decay. The bit line 525 is connected to one or more memory cells such as a memory cell MC1. A voltage clamp 524 can set a voltage on the bit line, such as during a sensing operation or during a program voltage. A local bus, LBUS1, allows the sense circuit controller to communicate with components in the sense circuit, such as the latches 550b and the voltage clamp in some cases. To communicate with the sense circuit 550a, the sense circuit controller provides a voltage via a line 502 to a transistor 504 to connect LBUS1 with a data bus DBUS, 503. The communicating can include sending data to the sense circuit and/or receive data from the sense circuit.

The sense circuit controller can communicate with different sense circuits in a time-multiplexed manner, for instance. A line 505 may be connected to the voltage clamp in each sense circuit, in one approach.

The sense circuit 551a includes latches 551b, including a trip latch 546 and data state latches 548. A voltage clamp 541 may be used to set a pre-charge voltage at a sense node 542. A sense node to bit line (BL) switch 543 selectively allows the sense node to communicate with a bit line 545, and a voltage clamp 544 can set a voltage on the bit line. The bit line 545 is connected to one or more memory cells such as a memory cell MC2. A local bus, LBUS2, allows the sense circuit controller to communicate with components in the sense circuit, such as the latches 551b and the voltage clamp in some cases. To communicate with the sense circuit 551a, the sense circuit controller provides a voltage via a line 501 to a transistor 506 to connect LBUS2 with DBUS.

The example memory cells MC1 and MC2 are connected to a selected word line WLn.

Figure 6A:
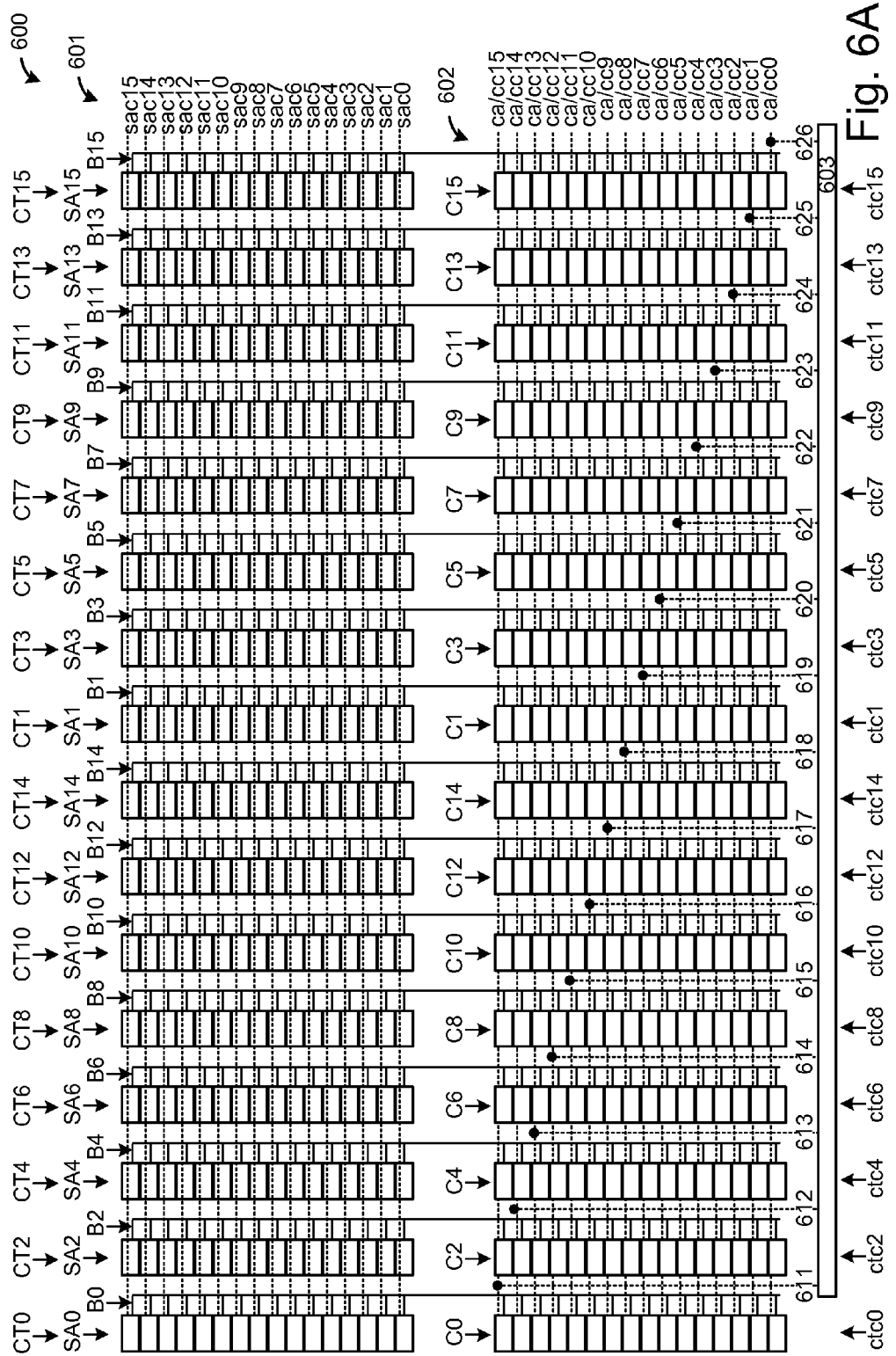
FIG. 6A depicts an example sensing circuit comprising sense amplifiers and caches arranged in 16 cache tiers.

FIG. 6A depicts an example sensing circuit 600 comprising sense amplifiers and caches arranged in 16 cache tiers. The sensing circuit includes a group of sense amplifiers 601 and a group of caches 602. The sensing circuit is arranged in cache tiers. Each cache tier (CT) comprises a set of N sense amplifiers (SAs) and a set of N caches connected by a bus, where N is an integer. This example uses 16 sense amplifiers and 16 caches in a cache tier. However, other approaches are possible. Typically, data is processed in units of bytes so that the number of SAs and caches in each CT is an integer number of bytes. Further, the number of SAs and caches per CT corresponds to the number of bytes in a data word, which is a unit of data which is input to or output from the sensing circuit at a given time. In the figures, a CT includes SAs and caches which are arranged in a vertical column.

The sixteen example CTs, sets of SAs, sets of caches and associated buses are marked as follows, from left to right in the figure: CT0, SA0, C0, B0; CT2, SA2, C2, B2; CT4, SA4, C4, B4; CT6, SA6, C6, B6; CT8, SA8, C8, B8; CT10, SA10, C10, B10; CT12, SA12, C12, B12; CT14, SA14, C14, B14; CT1, SA1, C1, B1; CT3, SA3, C3, B3; CT5, SA5, C5, B5; CT7, SA7, C7, B7; CT9, SA9, C9, B9; CT11, SA11, C11, B11; CT13, SA13, C13, B13; and CT15, SA15, C15, B15.

A SA tier or row may be defined which includes a set of SAs which are connected to a common control line and extend in a row in the figure. The SA control lines are labelled sac0-sac15 and carry control signals which select or deselect a row of SAs. A SA tier includes one SA from each CT. Typically, one SA row is selected at a time.

A cache row may be defined which includes a set of caches which are connected to a common access line and extend in a row in the figure. Cache access lines and cache control lines extend across rows of caches. For simplicity here, both types of lines are represented by one line labelled ca/cc (cache access/cache control). The cache access/control lines are labelled ca/cc0-ca/cc115. The cache access lines carry input/output data to or from the caches, while the cache control lines select a cache row. Additional cache tier select lines may be used to select a cache tier. The cache tier select lines are ctc0, ctc2, ctc4, ctc6, ctc8, ctc10, ctc12, ctc14, ctc1, ctc3, ctc5, ctc7, ctc9, ctc11, ctc13 and ctc15 for selecting CT0, CT2, CT4, CT6, CT8, CT10, CT12, CT14, CT1, CT3, CT5, CT7, CT9, CT11, CT13 and CT15, respectively. Generally, one SA row and one cache row are selected at a time, and one or more cache tiers may be selected at a time.

A cache row includes one cache from each CT. Typically, a SA control line is set high, for instance, to allow the SA and to communicate via a respective bus. A corresponding cache can be selected in the same cache tier to send or receive data. This allow an SA to receive a bit of data from a cache or to send a bit of data to a cache, concurrently within each cache tier. Each cache may store one bit of data.

A multiplexer 603 may have a 16 bit width to concurrently transfer one bit to or from each cache in a selected cache tier. The set of caches in a cache tier may be selectable via control signals so that one set of caches at a time is selected and connected to the cache control lines.

Multiplexer input/output paths 611-626 or lines are connected to the cache access lines, one input/output path per cache access line.

The different caches tiers may store data for a first sub-page (sub-page0) or a second sub-page (sub-page1). For example, CT0, CT2, CT4 and CT6, CT1, CT3, CT5 and CT7 may store data for sub-page0, and CT8, CT10, CT12 and CT14, CT9, CT11, CT13 and CT15 may store data for sub-page1.

FIG. 6B depicts an example arrangement of multiple sensing circuits such as the sensing circuit of FIG. 6A. In this example, there are several units 633 which comprise two of the sensing circuits 600. One sensing circuit is a left hand side 631 and the other sensing circuit is a right hand side 632. This is an example, as many other configurations are possible.

FIG. 6C depicts an example sensing circuit and input/output circuit consistent with FIG. 6B. The sensing circuit 661 includes a set of bits lines 640, sense amplifiers 641, data buses 642, and user caches 643. An input/output circuit 660 comprises input/output paths 644a, a logic circuit 644 and buses 645 for communicating with an external host, external to the memory chip. The buses may extend to I/O pads on the chip. In one approach, a bit size of the input/output paths in bits is equal to a bit size of a word.

FIG. 6D depicts an example configuration of data which is input to and output from the sensing circuit of FIG. 6A. Page0 represents a page of data such as 16 KB of data. In a logical column map, four logically consecutive words may be bundled. A sub-page0 represents a first half of the page and a sub-page1 represents a second half of the page, in a logical column map. Groups of bit lines 650 are mapped to different data in a physical diagram. In one example, to accommodate the bundle of four words, each groups may have 64 bit lines. Each word of a page is sixteen bits, and 4×16=64. In another example, a group of bit lines 651 is used in a fast read process where a sub-page of data is read from even-numbered bit lines or odd-numbered bit lines. Each group may have eight bit lines which store 8 bits, for example.

If two bits are stored in each memory cell, the bits are arranged in lower and upper pages, such as depicted in FIGS. 14A and 14B. If three bits are stored in each memory cell, the bits are arranged in lower, middle and upper pages, and so forth. The transfer of data to and from the sensing circuits may occur separately for each page of data.

FIG. 7A depicts an example programming process. Step 700 includes inputting write data to caches from an external host, such as the external host 140 of FIG. 2. Step 701 includes transferring the write data to the sense amplifiers, via the caches. Step 702 includes programming the write data into the memory cells of a selected word line.

FIG. 7B depicts an example read process, where memory cells of all bit lines are read concurrently. Step 705 includes reading data from all bit lines at the same time, in one approach. Step 706 includes transferring the read data from the sense amplifiers to the caches. Step 707 includes outputting the read data from the caches to the external host.

FIG. 7C depicts an example read process, where memory cells of even-numbered bit lines and odd-numbered bit lines are read separately. As mentioned, this approach can reduce read errors by reducing capacitive coupling between bit lines. Step 710 includes reading data from the memory cells of the even-numbered bit lines. Step 711 includes transferring the read data from the sense amplifiers to the caches. Step 712 includes reading data from the memory cells of the odd-numbered bit lines. Step 713 includes transferring the read data from the sense amplifiers to the caches. Step 714 includes outputting the read data from the caches to the external host. In one approach, each cache tier is filled with data, e.g., 16 bits of data, which includes 8 bits from the memory cells of the even-numbered bit lines and 8 bits from the memory cells of the odd-numbered bit lines. Alternatively, the memory cells of the odd-numbered bit lines could be read before the memory cells of the even-numbered bit lines. Similarly, in the figures below, the steps involving even-odd bit lines can occur for the odd-numbered bit lines before or after the even-numbered bit lines.

FIG. 7D depicts an example programming process consistent with FIG. 7A in which data is transferred from caches to sense amplifiers within each of the cache tiers of the sensing circuit of FIG. 6A. Step 720 begins a program operation. Step 721 includes storing data in the caches. Step 722 includes beginning the transfer of data from the caches to the sense amplifiers. Step 723 initializes a SA tier and cache index j=0. Step 724 selects a sense amplifier tier SA(j) and a cache(j). Step 725 transfers a bit from cache(j) to SA(j) in each CT. If j=15 (or other value which represents the last cache and sense amplifier in the cache tier) at decision step 727, the process is ended at step 728. If decision step 727 is false, j is incremented at step 726 and step 724 follows to select the next sense amplifier tier and cache.

Figure 7F:
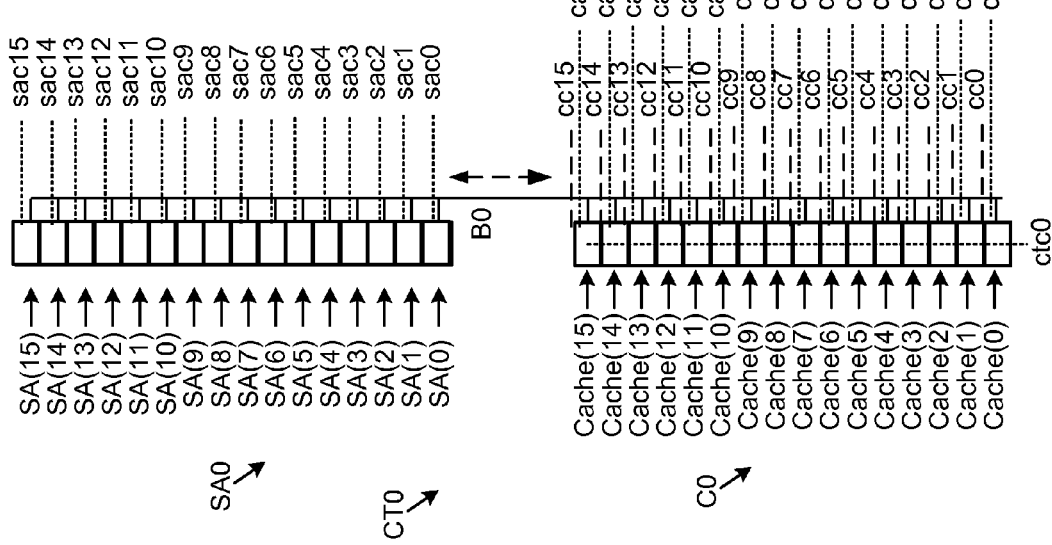
FIG. 7F depicts an example transfer of data between the sense amplifiers and the caches of the cache tier CT0 of FIG. 6A, consistent with the processes of FIGS. 7D and 7E.
Figure 7E:
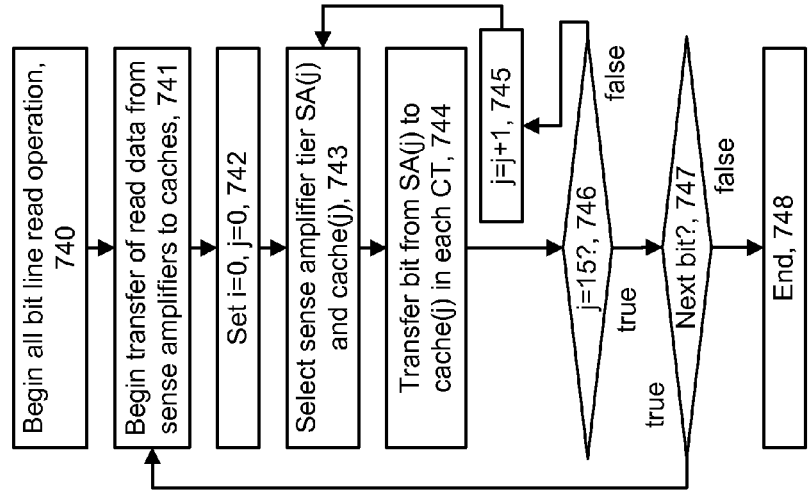
FIG. 7E depicts an example all bit line read process consistent with FIG. 7B in which data is transferred from sense amplifiers to caches within each of the cache tiers of the sensing circuit of FIG. 6A.

FIG. 7E depicts an example all bit line read process consistent with FIG. 7B in which data is transferred from sense amplifiers to caches within each of the cache tiers of the sensing circuit of FIG. 6A. This read process is a counterpart of the programming process of FIG. 7D. Step 740 begins an all bit line read operation. This includes the sense amplifiers sensing the conductive state of the memory cells while one or more control gate voltages are applied to the selected word line. Each SA may store one or more bits. A 0 bit may indicate that a memory cell is non-conductive and a 1 bit may indicate that a memory cell is conductive, for instance. Each bit can be transferred separately using the following steps. Further, the read operation may be any sensing operation, including a sensing operation which determines the data state of a cell after a programming operation has completed, or a sensing operation which determines the conductive state of a cell when a verify voltage is applied during a programming operation.

Step 741 includes beginning the transfer of data from the sense amplifiers to the caches. Step 742 initializes a SA tier and cache index j=0. Step 743 selects a sense amplifier tier SA(j) and a cache (j). Step 744 transfers a bit from SA(j) to cache(j) in each CT. If j=15 (or other value which represents the last cache and sense amplifier in the cache tier) at decision step 746, and there is no next bit to transfer at decision step 747, the process is ended at step 748. If there is a next bit, step 741 follows. If decision step 746 is false, j is incremented at step 745 and step 743 follows to select the next sense amplifier tier and cache.

FIG. 7F depicts an example transfer of data between the sense amplifiers and the caches of the cache tier CT0 of FIG. 6A, consistent with the processes of FIGS. 7D and 7E. The caches are labelled cache(0) to cache(15) in a set of caches C0 and the SAs are labeled SA(0) to SA(15) in a set of SAs SA0. In the program process, a bit is transferred from cache(0) in CT(0) to SA(0) in CT(0), then a bit is transferred from cache(1) in CT(0) to SA(1) in CT(0), and so forth. The data transfers all occur using the bus B0. This figure also depicts the SA control lines sac0-sac15, the cache control lines cc0-cc15, the cache access lines ca0-ca15 and a cache tier selection line ctc0 (which may carry a control signal which selects the cache tier CT0 and the set of caches C0).

Figure 8A:
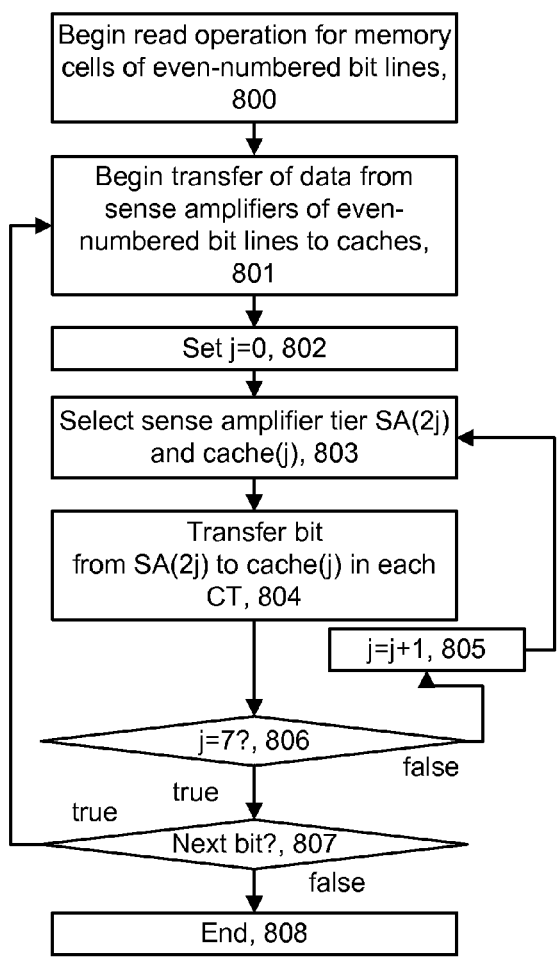
FIG. 8A depicts an example read process consistent with FIG. 7C, where read data is transferred from sense amplifiers of even-numbered bit lines to caches within each of the cache tiers of the sensing circuit of FIG. 6A.

FIG. 8A depicts an example read process consistent with FIG. 7C, where read data is transferred from sense amplifiers of even-numbered bit lines to caches within each of the cache tiers of the sensing circuit of FIG. 6A. See also FIG. 8C. Step 800 begins the read operation for the memory cells of the even-numbered bit lines. Step 801 includes beginning the transfer of data from the sense amplifiers of the even-numbered bit lines to the caches. Step 802 initializes a SA tier and cache index j=0. Step 803 selects a sense amplifier tier SA(2j) and a cache (j). Step 804 transfers a bit from SA(2j) to cache(j) in each CT. If j=7, for example, at decision step 806, and there is no next bit to transfer at decision step 807, the process is ended at step 808. If there is a next bit, step 801 follows. If decision step 806 is false, j is incremented at step 805 and step 803 follows to select the next sense amplifier tier and cache.

Figure 8B:
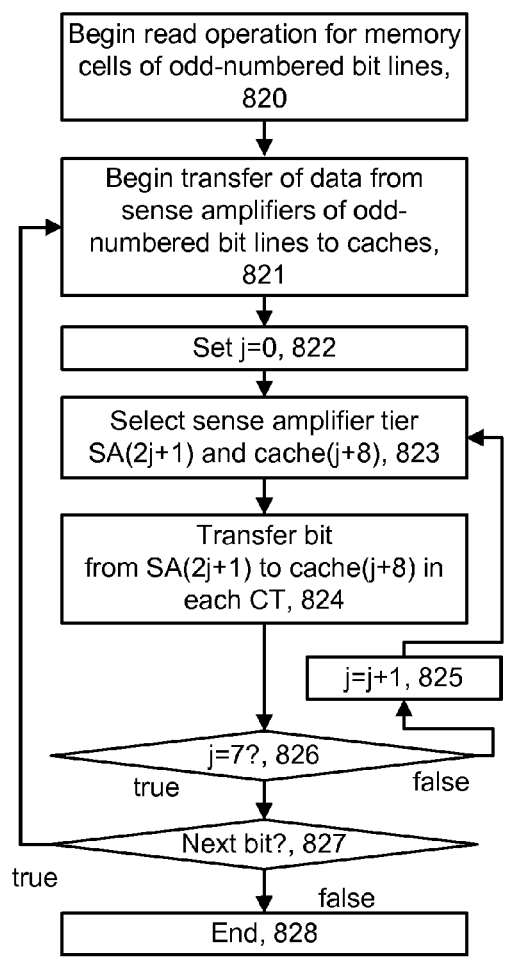
FIG. 8B depicts an example read process consistent with FIG. 7C, where read data is transferred from sense amplifiers of odd-numbered bit lines to caches within each of the cache tiers of the sensing circuit of FIG. 6A.

FIG. 8B depicts an example read process consistent with FIG. 7C, where read data is transferred from sense amplifiers of odd-numbered bit lines to caches within each of the cache tiers of the sensing circuit of FIG. 6A. See also FIG. 8D. Step 820 begins the read operation for the memory cells of the odd-numbered bit lines. Step 821 includes beginning the transfer of data from the sense amplifiers of the odd-numbered bit lines to the caches. Step 822 initializes a SA tier and cache index j=0. Step 823 selects a sense amplifier tier SA(2j+1) and a cache (j+8). Step 824 transfers a bit from SA(2j+1) to cache(j+8) in each CT. If j=7, for example, at decision step 826, and there is no next bit to transfer at decision step 827, the process is ended at step 828. If there is a next bit, step 821 follows. If decision step 826 is false, j is incremented at step 825 and step 823 follows to select the next sense amplifier tier and cache.

Figure 8D:
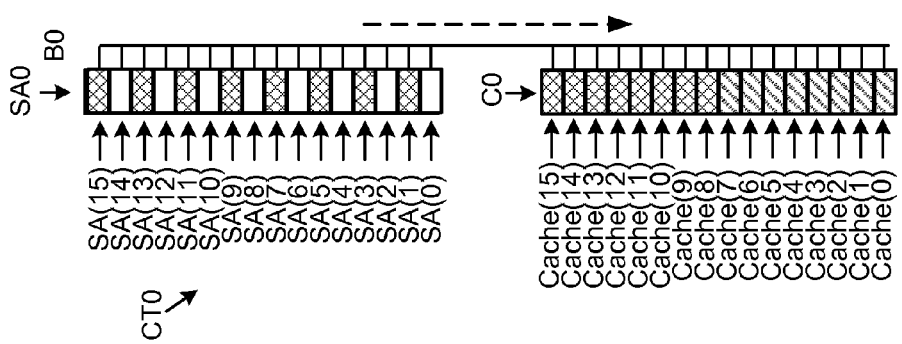
FIG. 8D depicts an example transfer of data between the sense amplifiers of the odd-numbered bit lines and the caches of the cache tier CT0 of FIG. 6A, consistent with the process of FIG. 8B.
Figure 8C:
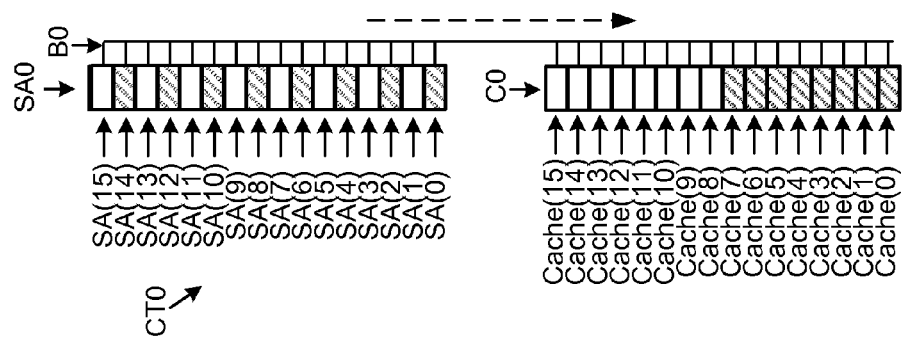
FIG. 8C depicts an example transfer of data between the sense amplifiers of the even-numbered bit lines and the caches of the cache tier CT0 of FIG. 6A, consistent with the process of FIG. 8A.

FIG. 8C depicts an example transfer of data between the sense amplifiers of the even-numbered bit lines and the caches of the cache tier CT0 of FIG. 6A, consistent with the process of FIG. 8A. The data of the sense amplifiers SA(0), SA(2), SA(4), SA(6), SA(8), SA(10), SA(12) and SA(14) is transferred to cache(0), cache(1), cache(2), cache(3), cache (4), cache(5), cache(6) and cache(7), respectively, on the bus B0.

FIG. 8D depicts an example transfer of data between the sense amplifiers of the odd-numbered bit lines and the caches of the cache tier CT0 of FIG. 6A, consistent with the process of FIG. 8B. The data of the sense amplifiers SA(1), SA(3), SA(5), SA(7), SA(9), SA(11), SA(13) and SA(15) is transferred to cache(8), cache(9), cache(10), cache(11), cache(12), cache(13), cache(14) and cache(15), respectively, on the bus B0.

Figure 9A:
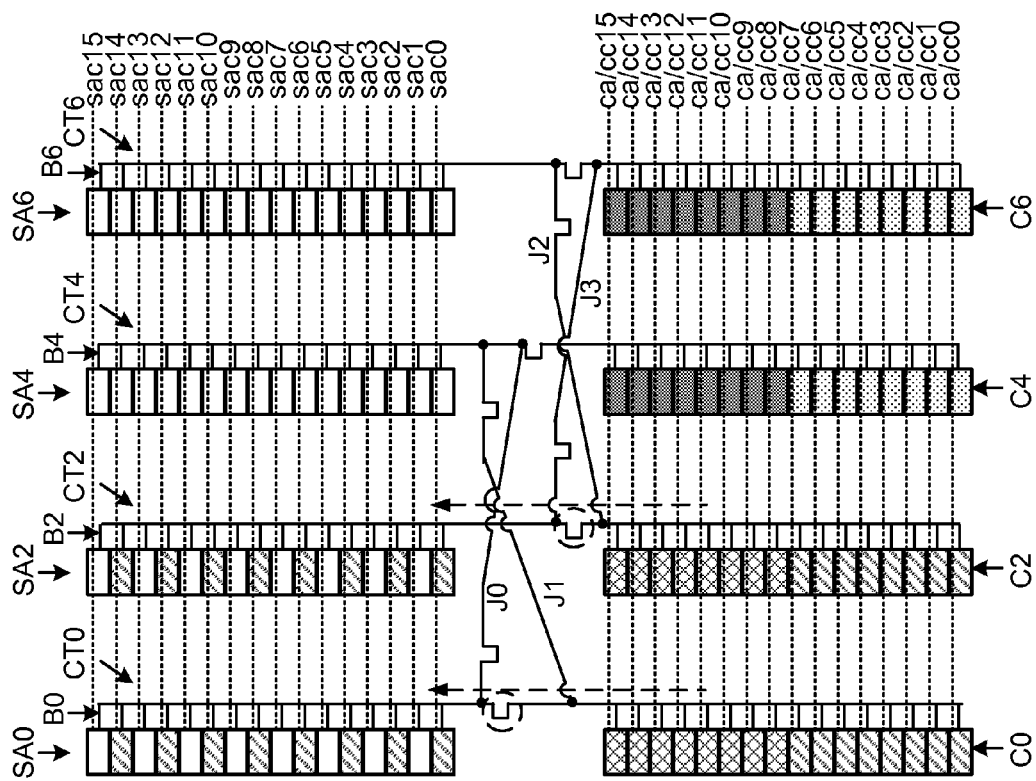
FIG. 9A depicts an example transfer of data between the sense amplifiers and the caches of the cache tiers CT0, CT2, CT4 and CT6 of FIG. 6A, where each cache tier has a single bus, buses of different tiers are connected to one another, and a same-tier transfer is shown.

FIG. 9A depicts an example transfer of data between the sense amplifiers and the caches of the cache tiers CT0, CT2, CT4 and CT6 of FIG. 6A, where each cache tier has a single bus, buses of different tiers are connected to one another, and a same-tier transfer is shown. One approach to remapping the date to facilitate even-odd reading as in FIG. 7C is to remap the data such that data in the first half (e.g., lower byte) of the caches is transferred to the SAs of the even-numbered bit lines in the same tier, while data in the second half (e.g., upper byte) of the caches is transferred to the SAs of the even-numbered bit lines in another tier. This approach involves jumper paths between the buses of each cache tier. For example, jumpers J0 and J1 are provided between B0 and B4, and jumpers J2 and J3 are provided between B2 and B6. A transistor is also provided in each bus and jumper. Each transistor can be provided in a conductive or non-conductive state according to control signals and paths, not shown.

In this example, the transistor in B0 is conductive to allow data to be transferred from the caches to the SAs in CT0. Similarly, the transistor in B2 is conductive to allow data to be transferred from the caches to the SAs in CT2. The dashed circles denote the conductive transistors, while the others are non-conductive. CT4 and CT6 are used in a cross-tier transfer, shown in FIG. 9B.

Figure 9B:
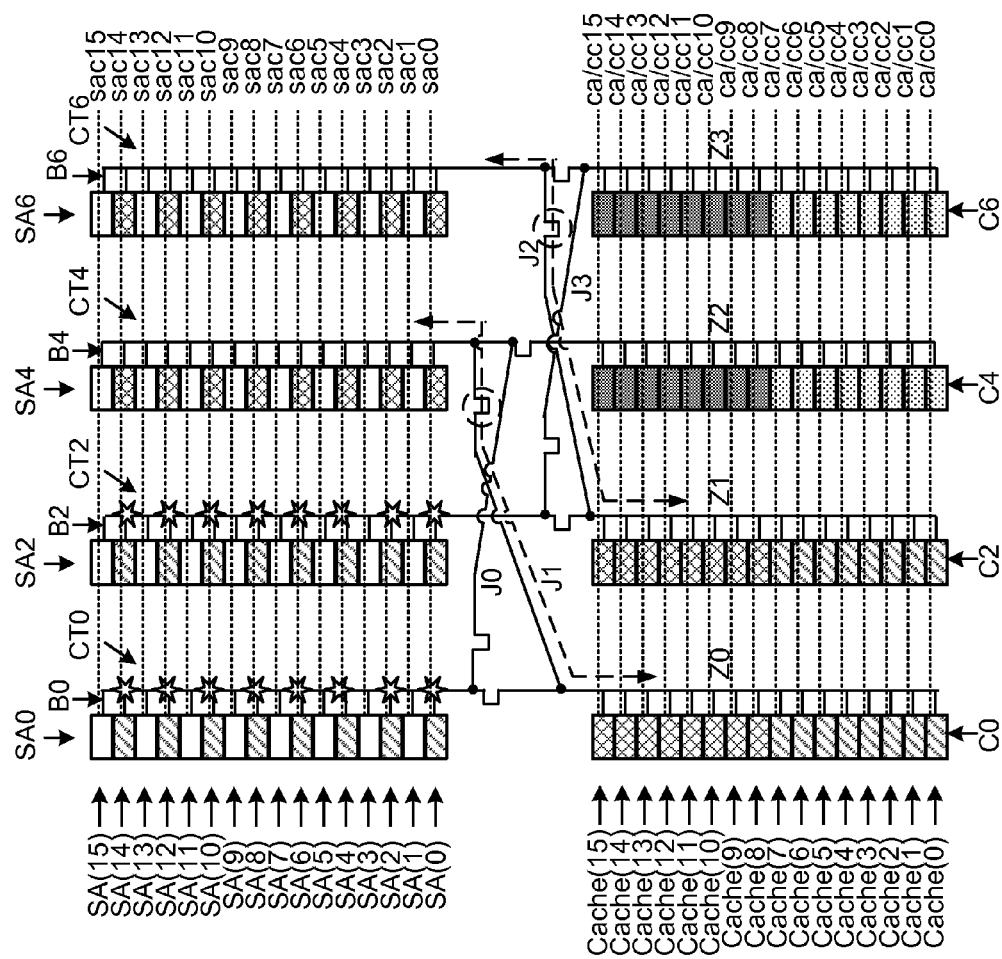
FIG. 9B depicts an example transfer of data between the sense amplifiers and the caches of the cache tiers CT0, CT2, CT4 and CT6 of FIG. 6A, where each cache tier has a single bus, buses of different tiers are connected to one another, and a cross-tier transfer is shown.

FIG. 9B depicts an example transfer of data between the sense amplifiers and the caches of the cache tiers CT0, CT2, CT4 and CT6 of FIG. 6A, where each cache tier has a single bus, buses of different tiers are connected to one another, and a cross-tier transfer is shown. For example, CT0, CT2, CT4 and CT6 have buses Z0, Z1, Z2 and Z3, respectively. The transistors in J1 and J2 are conductive so that B0 is connected to B4, and B2 is connected to B6. However, the SA lines sac0-sac15 are common across the different CTs and SAs. This can result in write disturb of SAa in CT0 and CT2, as depicted by the star symbols. For example, when ca0 and sac0 are set high, and CT0 and CT4 are selected, this allows cache(0) in CT0 to send a bit to SA(0) in CT4. Similarly, when ca0 and sac0 are set high, and CT2 and CT6 are selected, this allows cache(0) in CT2 to send a bit to SA(0) in CT6. However, when sac0 is high, SA(0) in CT0 communicates with B0, and SA(0) in CT2 communicates with B2. This communication can disturb the voltages in the sense amps which represent a bit. In particular, the transfer of the upper byte (or half word) of the caches to SAs can affect the previously-stored lower bytes (or half word) in the SAs. This is due to the transfer of the half words at different times. The write disturb problem happens occurs due to a common write control for the sense amplifiers and a time-sharing write access for different byte sets. Specifically, since the data bus is shared by 16 SA units, the data transfer between a cache and a SA is done sequentially.

For example, assume data is transferred in CT0 from cache(0)-cache(7) to SA(0), SA(2), SA(4), SA(6), SA(8), SA(10), SA(12) and SA(14), respectively, in eight sequential transfers on Z0. After the last transfer, the data of SA(14) remains on Z0. A next transfer is a cross-tier transfer from CT0 to CT4. Data is transferred from cache(8)-cache(15) in CT0 to SA(0), SA(2), SA(4), SA(6), SA(8), SA(10), SA(12) and SA(14), respectively, in CT4, in eight sequential transfers on Z0. However, for the first transfer, from cache(8) in CT0 to SA(0) in CT4, the data of SA(14) in CT0 remains on Z0. If the data of SA(0) in CT4 is different than the data of SA(14) in CT0, the SA(0) data might be corrupted by the SA(14) data. Similarly, the SA(0) data of CT4 might be corrupted by remaining data on Z2.

Figure 10A:
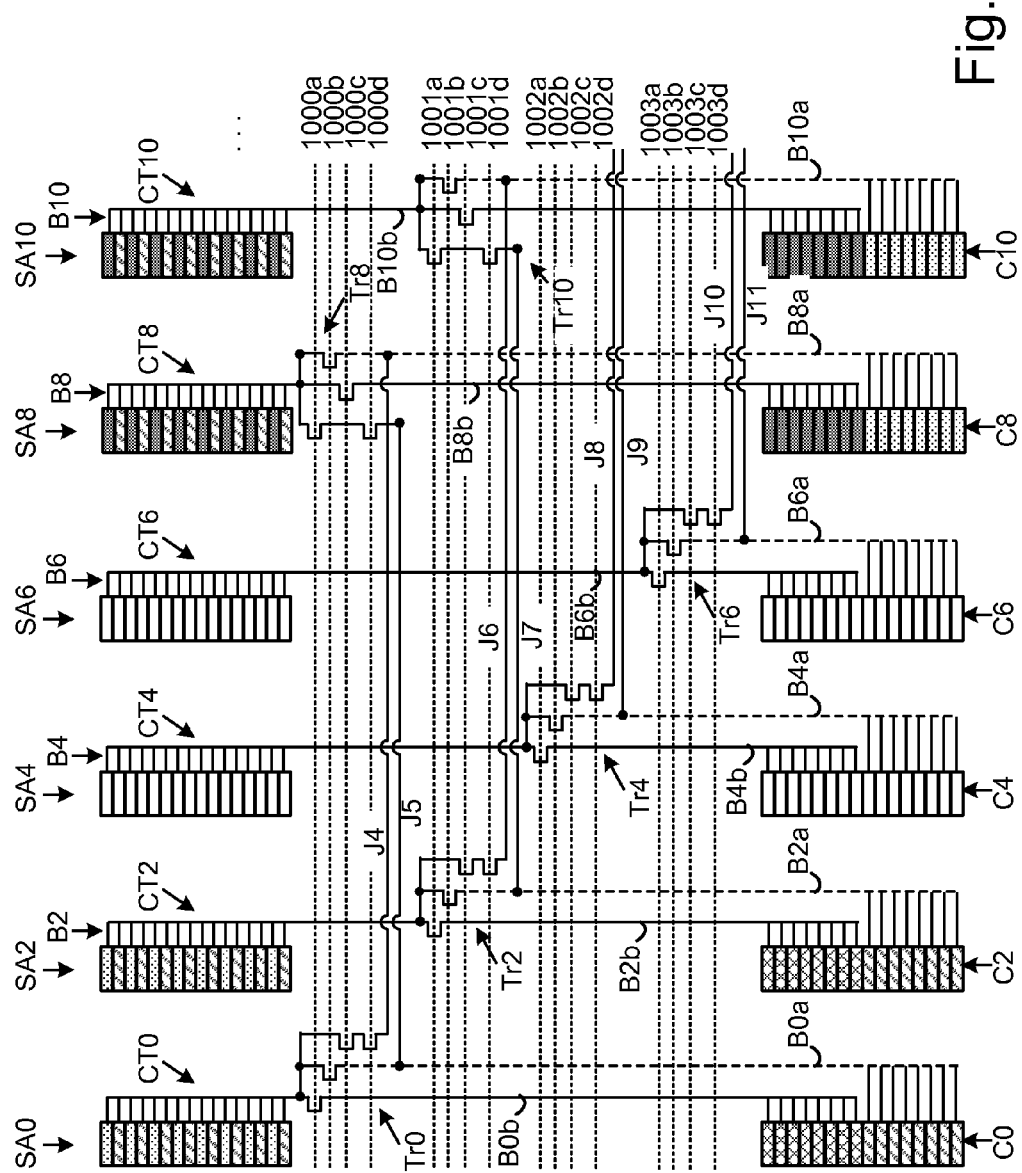
FIG. 10A depicts example data buses in the sensing circuit of FIG. 6A, where each cache tier has dual buses, and buses of different tiers are connected to one another.

FIG. 10A depicts example data buses in the sensing circuit of FIG. 6A, where each cache tier has dual buses, and buses of different tiers are connected to one another. By providing separate buses for the in-tier and cross-tier transfers, and for the lower and upper halves of the caches, the SAs can be protected from disturbs. This is due to the concurrent transfer of the half words. Buses B0b, B2b, B4b, B6b, B8b and B10b are dedicated to in-tier transfers within CT0, CT2, CT4, CT6, CT8 and CT10, respectively. These are first data buses in each cache tier and are represented by solid lines. Second data buses in each cache tier are represented by dashed lines. Buses B0a and B8a are dedicated to cross-tier transfers between CT0 and CT8. Buses B2a and B10a are dedicated to cross-tier transfers between CT2 and CT10. Buses B4a and B12a (in CT12 in FIG. 6A, not shown) are dedicated to cross-tier transfers between CT4 and CT12. Buses B6a and B14a (in CT14 in FIG. 6A, not shown) are dedicated to cross-tier transfers between CT6 and CT14.

A jumper J4 connects B0b or B0a with B8a. A jumper J5 connects B0a with B8b or B8a. A jumper J6 connects B2b or B2a with B10a. A jumper J7 connects B2a with B10b or B10a. A jumper J8 connects B4b or B4a with B12a. A jumper J9 connects B4a with B12b or B12a (not shown). A jumper J10 connects B6b or B6a with B14a. A jumper J11 connects B6a with B14b or B14a (not shown).

Further, a set of, e.g., four transistors is associated with the dual buses of each cache tier. Control lines 1000a-1000d are connected to transistors Tr0 and Tr8 in CT0 and CT8, respectively. Control lines 1001a-1001d are connected to transistors Tr2 and Tr10 in CT2 and CT10, respectively. Control lines 1002a-1002d are connected to transistors Tr4 and Tr12 (not shown) in CT4 and CT12, respectively. Control lines 1003a-1003d are connected to transistors Tr6 and Tr14 (not shown) in CT6 and CT14, respectively. The control lines can provide the associated transistors in a conductive (on) or non-conductive (off) state to carry out an in-tier or cross-tier transfer, as described below.

The transistors can be set according to data stored in ROM fuses in the memory device, e.g., to enable the cross-tier transfer for half-page even-odd sensing (first mode) or to disable it for full-page all bit line sensing (second mode). Thus, there is backwards compatibility with the full page sensing mode.

This is an example of a plurality of sense amplifiers (sets of sense amplifiers SA0, SA2, SA4, SA6, SA8, SA10) and a plurality of caches (sets of caches C0, C2, C4, C6, C8, C10), one cache per sense amplifier, wherein each sense amplifier is connected to a respective memory cell in a word line via a respective bit line, the respective bit lines comprise a first set of every other bit line (e.g., even-numbered bit lines) and a second set of every other bit line (e.g., odd-numbered bit lines), and the plurality of sense amplifiers and the plurality of caches are arranged in a plurality of pairs of tiers (e.g., CT0 and CT8, CT2 and CT10, . . . ). Each pair of tiers comprises: a first tier (CT0) and a second tier (CT8). The first tier comprising N sense amplifiers including N/2 sense amplifiers (SA(0), SA(2), SA(4), SA(6), SA(8), SA(10), SA(12), SA(14) in CT0 associated with the first set of every other bit line and N/2 sense amplifiers (SA(1), SA(3), SA(5), SA(7), SA(9), SA(11), SA(13) and SA(15) in CT0), associated with the second set of every other bit line. The first tier also comprises N caches including a first set of N/2 caches (cache(0)-cache(7) in CT0) and a second set of N/2 caches (cache(8)-cache(15) in CT0). The second tier also comprises N sense amplifiers including N/2 sense amplifiers (SA(0), SA(2), SA(4), SA(6), SA(8), SA(10), SA(12), SA(14) in CT8) associated with the first set of every other bit line and N/2 sense amplifiers (SA(1), SA(3), SA(5), SA(7), SA(9), SA(11), SA(13) and SA(15) in CT8) associated with the second set of every other bit line. The second tier also comprising N caches including a first set of N/2 caches (cache(0)-cache(7) in CT8) and a second set of N/2 caches (cache(8)-cache(15) in CT8).

Each pair of tiers comprises switchable paths, e.g., buses and jumpers (B0b, B0a, J4, J5, B8b, B8a) which are configurable in a first mode in which the N/2 sense amplifiers of the second tier associated with the first set of every other bit line are connected to the first set of N/2 caches of the first tier and the N/2 sense amplifiers of the first tier associated with the first set of every other bit line are connected to the second set of N/2 caches of the first tier, and in a second mode in which the N/2 sense amplifiers of the second tier associated with the second set of every other bit line are connected to the second set of N/2 caches of the second tier and the N/2 sense amplifiers of the first tier associated with the second set of every other bit line are connected to the first set of N/2 caches of the second tier.

Figure 10B:
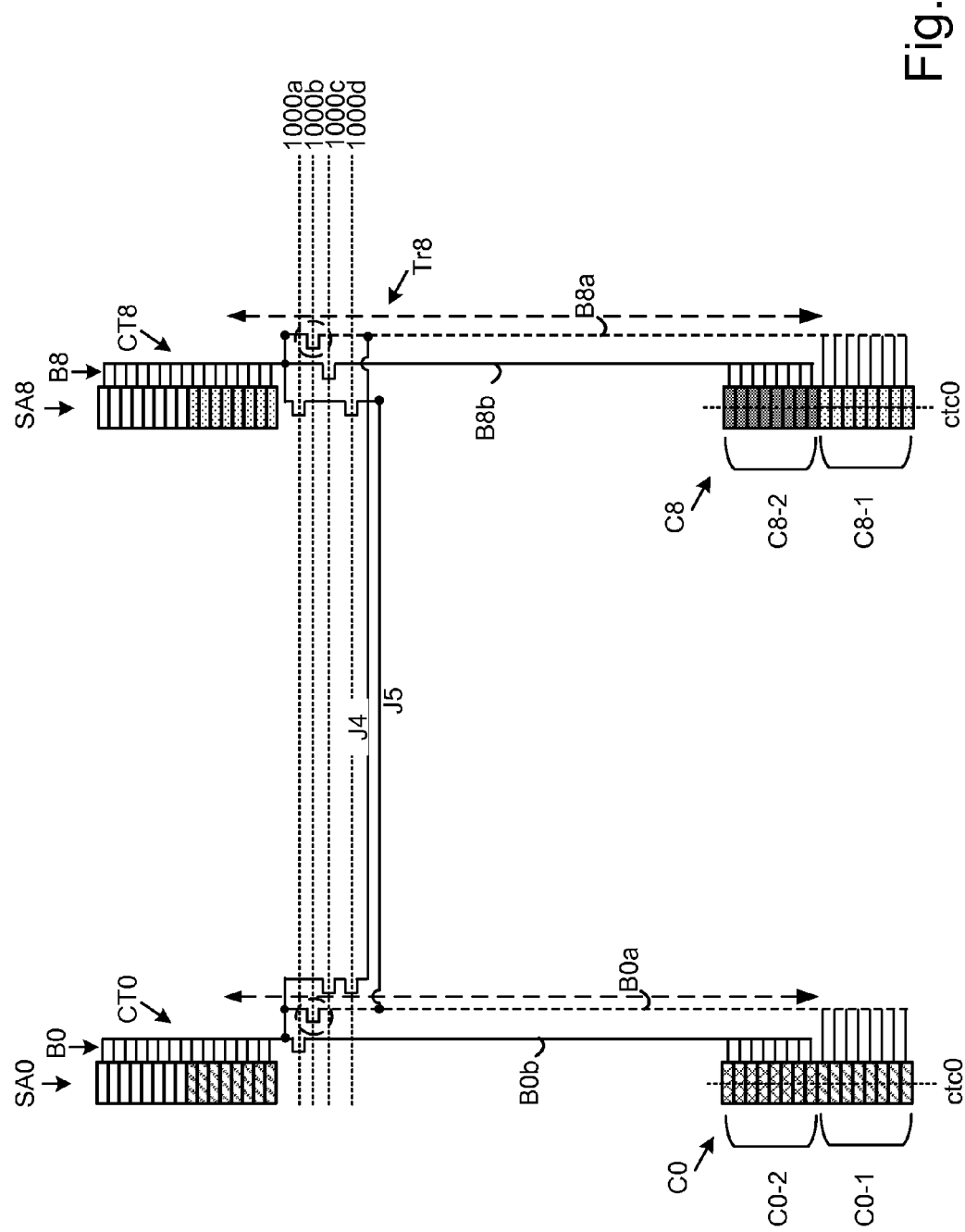
FIG. 10B depicts an example same-tier transfer of data in the cache tiers CT0 and CT8 of FIG. 10A, during a programming or reading operation, where a first half (e.g., lower byte) of a data word is transferred, and adjacent sense amplifiers are used in the transfer.
Figure 10C:
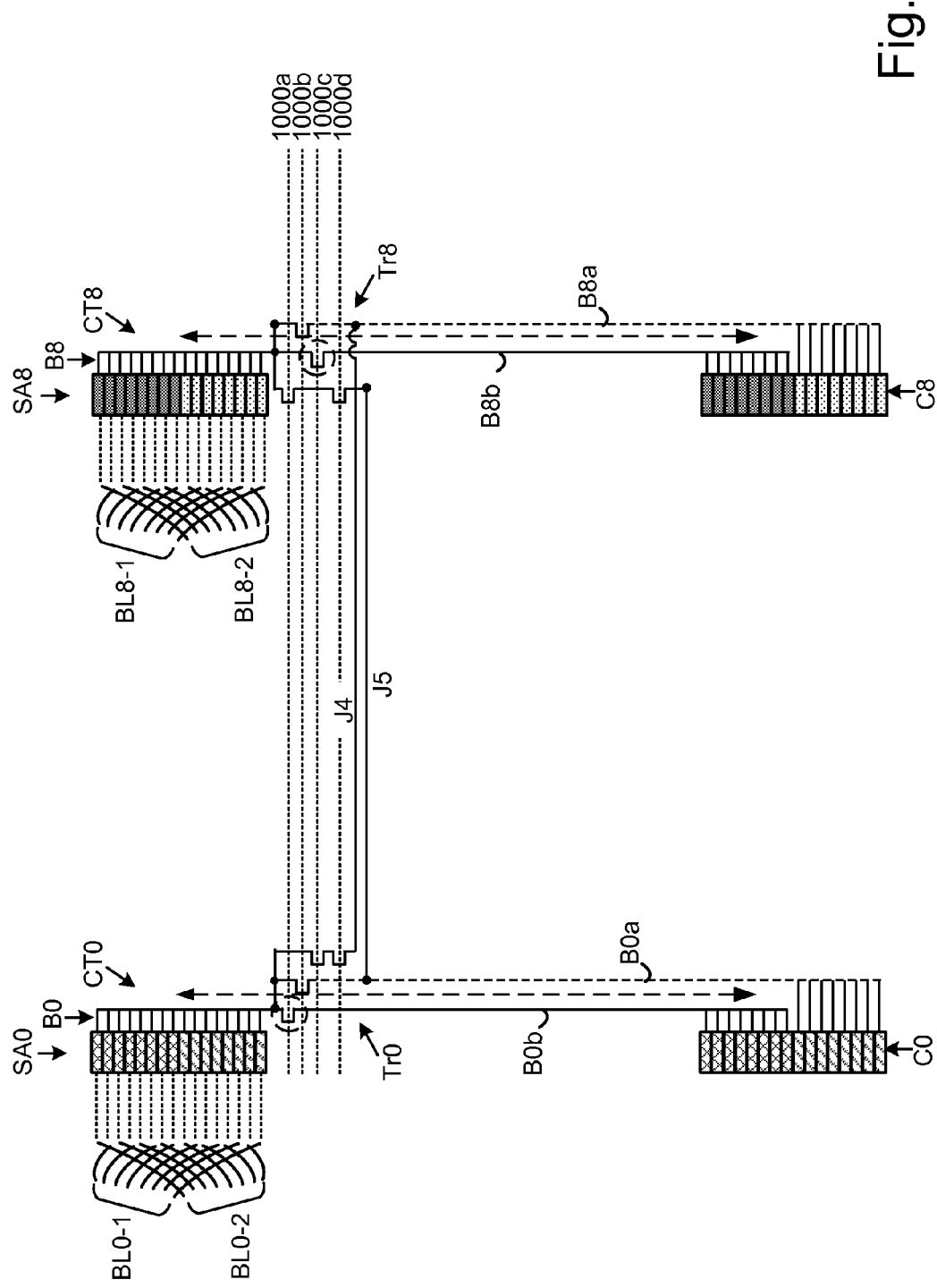
FIG. 10C depicts an example same-tier transfer of data in the cache tiers CT0 and CT8 of FIG. 10A, during a programming or reading operation, where a second half (e.g., upper byte) of a data word is transferred, and adjacent sense amplifiers are used in the transfer.

The transfers of FIGS. 10B and 10C can occur in the second mode of FIG. 10A, for example.

FIG. 10B depicts an example same-tier transfer of data in the cache tiers CT0 and CT8 of FIG. 10A, during a programming or reading operation, where a first half (e.g., lower byte) of a data word is transferred, and adjacent sense amplifiers are used in the transfer. The dashed circles denote the conductive transistors, while the others are non-conductive. Programming transfers data from the caches to the SAs so that the data can be written into the memory cells. Specifically, in CT0, data in cache(0)-cache(7) is transferred to SA(0)-SA(7), respectively, via B0a. Similarly, in CT8, data in cache(0)-cache(7) is transferred to SA(0)-SA(7), respectively, via B8a. Reading transfers data to the caches from the SAs so that the data can be transferred externally. Specifically, in CT0, data in SA(0)-SA(7) is transferred to cache(0)-cache(7), respectively, via B0a. Similarly, in CT8, data in SA(0)-SA(7) is transferred to cache(0)-cache(7), respectively, via B8a.

A first tier (CT0) includes a first set of N/2 adjacent caches C0-1 (e.g., N=16), a second set of N/2 caches C0-2. A second tier (CT8) includes a first set of N/2 adjacent caches C8-1 and a second set of N/2 caches C8-2. Also depicted is a cache tier selection line ctc0 (which may carry a control signal which selects the cache tier CT0 and the set of caches C0) and a cache tier selection line ctc8 (which may carry a control signal which selects the cache tier CT8 and the set of caches C8).

FIG. 10C depicts an example same-tier transfer of data in the cache tiers CT0 and CT8 of FIG. 10A, during a programming or reading operation, where a second half (e.g., upper byte) of a data word is transferred, and adjacent sense amplifiers are used in the transfer. For programming, in CT0, data in cache(8)-cache(15) is transferred to SA(8)-SA(15), respectively, via B0a. In CT8, data in cache(8)-cache(15) is transferred to SA(8)-SA(15), respectively, via B8a. For reading, in CT0, data in SA(8)-SA(15) is transferred to cache(8)-cache(15), respectively, via B0a. Similarly, in CT8, data in SA(8)-SA(15) is transferred to cache(8)-cache(15), respectively, via B8a.

Example bits lines are also depicted which are connected to the SAs. For example, BL0-1 is a first set of every other bit line (e.g., even-numbered bit lines) associated with SA0-1 in FIG. 10D, BL0-2 is a second set of every other bit line (e.g., odd-numbered bit lines) associated with SA0-2 in FIG. 10D, BL8-1 is a first set of every other bit line (e.g., even-numbered bit lines) associated with SA8-1 in FIG. 10D, and BL8-2 is a second set of every other bit line (e.g., odd-numbered bit lines) associated with SA8-2 in FIG. 10D.

Figure 10D:
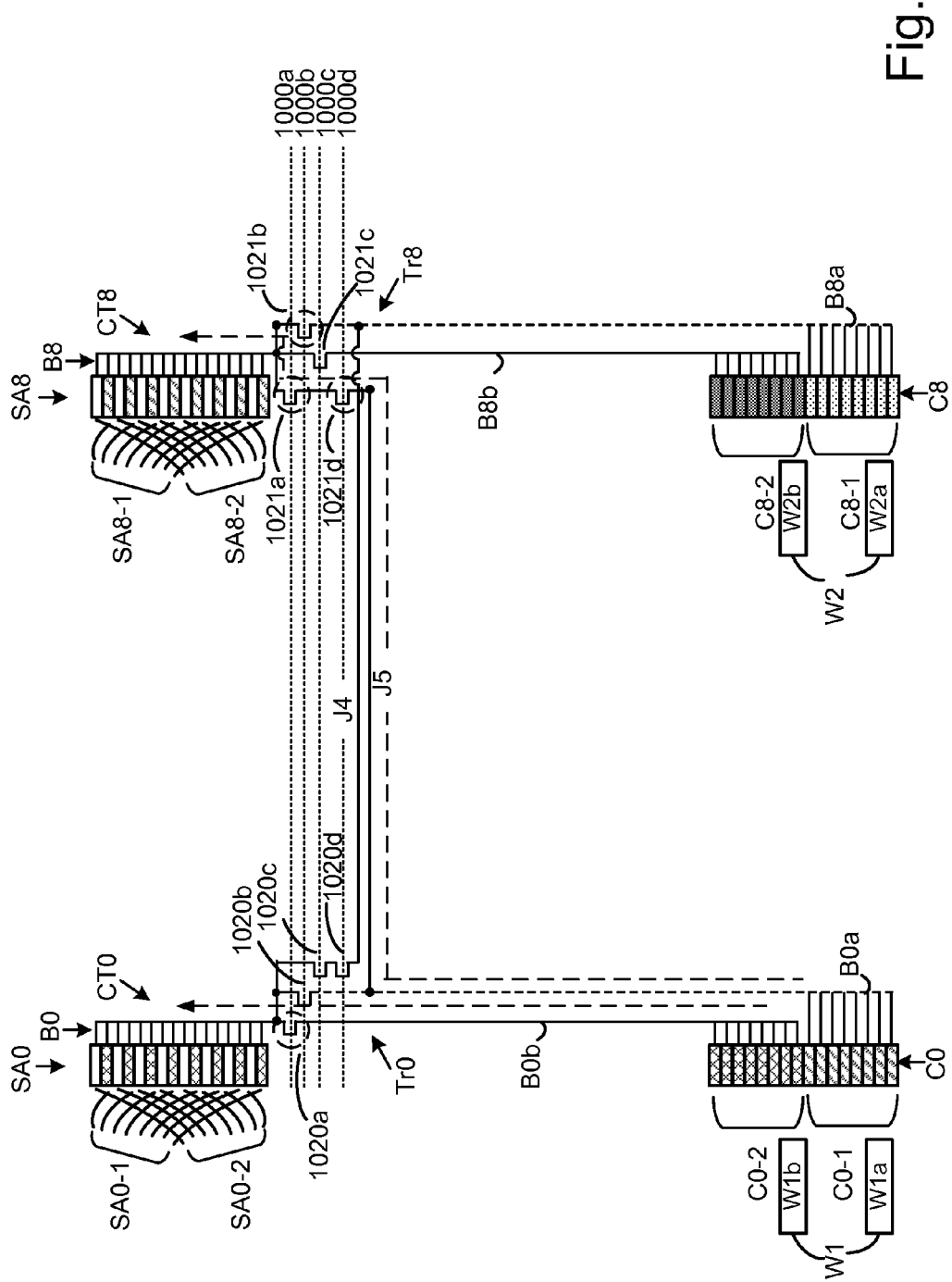
FIG. 10D depicts an example transfer of data in the cache tiers CT0 and CT8 of FIG. 10A during a programming operation, where a first half (e.g., lower byte) of a data word is transferred from CT0 to CT8, and a second half (e.g., upper byte) of a data word is transferred within CT0, and even-numbered sense amplifiers are used in the transfer.

FIG. 10D depicts an example transfer of data in the cache tiers CT0 and CT8 of FIG. 10A during a programming operation, where a first half (e.g., lower byte) of a data word is transferred from CT0 to CT8, a second half (e.g., upper byte) of a data word is transferred within CT0, and even-numbered sense amplifiers are used in the transfer. For the same-tier transfer, data in cache(8), cache(9), cache(10), cache(11), cache(12), cache(13), cache(14) and cache(15) in CT0 is transferred to SA(0), SA(2), SA(4), SA(6), SA(8), SA(10), SA(12) and SA(14), respectively, in CT0 via B0b. For the cross-tier transfer, data in cache(0), cache(1), cache(2), cache(3), cache(4), cache(5), cache(6) and cache(7) in CT0 is transferred to SA(0), SA(2), SA(4), SA(6), SA(8), SA(10), SA(12) and SA(14), respectively, in CT8 via B0a and J5. Advantageously, the same-tier transfer and the cross-tier transfer can occur at the same time so that disturbs are reduced.

This is an example of, for each pair of cache tiers, the switchable paths comprising: a first data bus (B0a) of the first tier (CT0) connected to the N sense amplifiers (SA0) of the first tier and the first set of N/2 caches (100b1) of the first tier; a second data bus (B0b) of the first tier connected to the N sense amplifiers of the first tier and the second set of N/2 caches (C0-2) of the first tier; a first data bus (B8a) of the second tier connected to N sense amplifiers (SA8) of the second tier and the first set of N/2 caches (C8-1) of the second tier; a second data bus (B8b) of the second tier connected to the N sense amplifiers of the second tier and the second set of N/2 caches (C8-2) of the second tier; a first jumper (J5) connected to the first data bus of the first tier and the second data bus of the second tier; and a second jumper (J4) connected to the second data bus of the first tier and the first data bus (B8a) of the second tier.

Additionally, a first control line (1000a) is connected to a control gate of a transistor (1020a) in the second data bus of the first tier and to a control gate of a transistor (1021a) in the first jumper; a second control line (1000b) is connected to a control gate of a transistor (1020b) in the first data bus of the first tier and to a control gate of a transistor (1021b) in the first data bus of the second tier; a third control line (1000c) is connected to a control gate of a transistor (1020c) in the second jumper and to a control gate of a transistor (1021c) in the second data bus of the second tier; and a fourth control line (1000d) is connected to a control gate of a transistor (1020d) in the second jumper, and to a control gate of a transistor (1021d) in the first jumper.

A control circuit is associated with the first, second, third and fourth control lines, wherein the control circuit is configured to: in a first mode, provide an ON voltage on the first and fourth control lines and provide an OFF voltage on the second and third control lines; and in a second mode, provide an ON voltage on the third and fourth control lines and provide an OFF voltage on the first and second control lines.

Alternatively, switches (Tr0, Tr8) are associated with the first and second data bus of the first tier, the first and second data bus of the second tier, and the first and second jumpers, wherein for each pair of tiers, the switches are configurable in a first mode in which: the first data bus of the first tier, the first jumper and the second data bus of the second tier connect N/2 sense amplifiers (SA8-1) of the second tier associated with the first set of every other bit line with the first set of N/2 caches (C0-1) of the first tier; and the second data bus of the first tier connects the N/2 sense amplifiers (SA0-1) of the first tier associated with the first set of every other bit line with the second set of N/2 caches (C0-2) of the first tier. Further, for each pair of tiers, the switches are configurable in a second mode at a different time than the first mode in which: the first data bus of the first tier, the second jumper and the first data bus of the second tier connect the N/2 sense amplifiers (SA0-2) of the first tier associated with the second set of every other bit line with the first set of N/2 caches (C8-1) of the second tier (see FIG. 10F); and the second data bus of the second tier connects the N/2 sense amplifiers (SA8-2) of the second tier associated with the second set of every other bit line with the second set of N/2 caches (C8-2) of the second tier.

A control circuit, in a programming operation, is configured to, in the first mode: transfer a first half (W1a) of a first word of data (W1) from the first set of N/2 caches (C0-1) of the first tier to the N/2 sense amplifiers (SA8-1) of the second tier associated with the first set of every other bit line via the first data bus of the first tier, the first jumper and the second data bus of the second tier; and transfer a second half (W1b) of the first word of data from the second set of N/2 caches (C0-2) of the first tier to the N/2 sense amplifiers (SA0-1) of the first tier associated with the first set of every other bit line via the second data bus of the first tier.

The first word of data may comprise bits of a page of data which is to be programmed into one set of N memory cells, and the second word of data may comprise bits of the page of data which is to be programmed into another set of N memory cells.

The control circuit, in the programming operation, is configured to, in the second mode: transfer a first half (W2a) of a second word of data (W2) from the first set of N/2 caches (C8-1) of the second tier to the N/2 sense amplifiers (SA0-2) of the first tier associated with the second set of every other bit line via the first data bus of the first tier, the second jumper and the first data bus of the second tier; and transfer a second half (W2b) of the second word of data from the second set of N/2 caches (C8-2) of the second tier to the N/2 sense amplifiers (SA8-2) of the second tier associated with the second set of every other bit line via the second data bus of the second tier.

The control circuit, in a read operation is configured to, in the first mode: transfer a first half (W1a) of a first word of data (W1) from the N/2 sense amplifiers (SA8-1) of the second tier associated with the first set of every other bit line to the first set of N/2 caches (C0-1) of the first tier via the first data bus of the first tier, the first jumper and the second data bus of the second tier; and transfer a second half (W1b) of the first word of data (W1) from the N/2 sense amplifiers (SA0-1) of the first tier associated with the first set of every other bit line to the second set of N/2 caches (C0-2) of the first tier via the second data bus of the first tier. Further, the control circuit in the read operation is configured to, in the second mode: transfer a first half (W2a) of a second word of data (W2) from the N/2 sense amplifiers of the first tier associated with the second set of every other bit line to the first set of N/2 caches (C8-1) of the second tier via the first data bus of the first tier, the second jumper and the first data bus of the second tier; and transfer a second half (W2b) of the second word of data from the N/2 sense amplifiers of the second tier associated with the second set of every other bit line to the second set of N/2 caches (C8-2) of the second tier via the second data bus of the second tier.

In another embodiment, a sensing method comprises: performing a sensing operation involving memory cells, wherein: a plurality of sense amplifiers and a plurality of caches are provided, one cache per sense amplifier, each sense amplifier is connected to a respective memory cell in a word line via a respective bit line, the respective bit lines comprise a first set of every other bit line and a second set of every other bit line, the plurality of sense amplifiers and the plurality of caches are arranged in at least a first tier (CT0) and a second tier (CT8), the first tier comprising N/2 sense amplifiers associated with the first set of every other bit line, N/2 sense amplifiers associated with the second set of every other bit line, a first set of N/2 caches and a second set of N/2 caches, the second tier comprising N/2 sense amplifiers associated with the first set of every other bit line, N/2 sense amplifiers associated with the second set of every other bit line, a first set of N/2 caches and a second set of N/2 caches; the performing the sensing operation comprises in a first period: sensing memory cells connected to the first set of every other bit line and storing associated data comprising a first half of a first word of data in the N/2 sense amplifiers of the first tier associated with the first set of every other bit line and storing associated data comprising a first half of a second word of data in the N/2 sense amplifiers of the second tier associated with the first set of every other bit line; transferring the first half of the first word of data from the N/2 sense amplifiers of the first tier associated with the first set of every other bit line to the second set of N/2 caches of the first tier; and transferring the first half of the second word of data from the N/2 sense amplifiers of the second tier associated with the first set of every other bit line to the first set of N/2 caches of the first tier.

A sensing circuit may be provided with means for performing each step in the above-mentioned method.

In another embodiment, a sensing method comprises: sensing memory cells connected to a first set of every other bit line of a plurality of bit lines and storing associated data comprising a first half (W1a) of a first word of data in a first set of sense amplifiers (SA8-1) and storing associated data comprising a first half (W2a) of a second word of data in a second set of sense amplifiers (SA0-2) (see also FIG. 10F); transferring the first half of the first word of data from the first set of sense amplifiers to a first set of caches (C0-1); transferring the first half of the second word of data from the second set of sense amplifiers to a second set of caches (C8-1); concurrently transferring to an input/output path at a first time, the first half of the first word of data from the first set of caches and the first half of the second word of data from the second set of caches; sensing memory cells connected to a second set of every other bit line of the plurality of bit lines and storing associated data comprising a second half (W1b) of the first word of data in a third set of sense amplifiers (SA0-1) and storing associated data comprising a second half (W2b) of the second word of data in a fourth set of sense amplifiers (SA0-2) (see FIG. 10F); transferring the second half of the first word of data from the third set of sense amplifiers to a third set of caches (C0-2); transferring the second half of the second word of data from the fourth set of sense amplifiers to a fourth set of caches (C8-2); and concurrently transferring to the input/output path at a second time, the second half of the first word of data from the third set of caches and the second half of the second word of data from the fourth set of caches.

A sensing circuit may be provided with means for performing each step in the above-mentioned method.

Figure 10E:
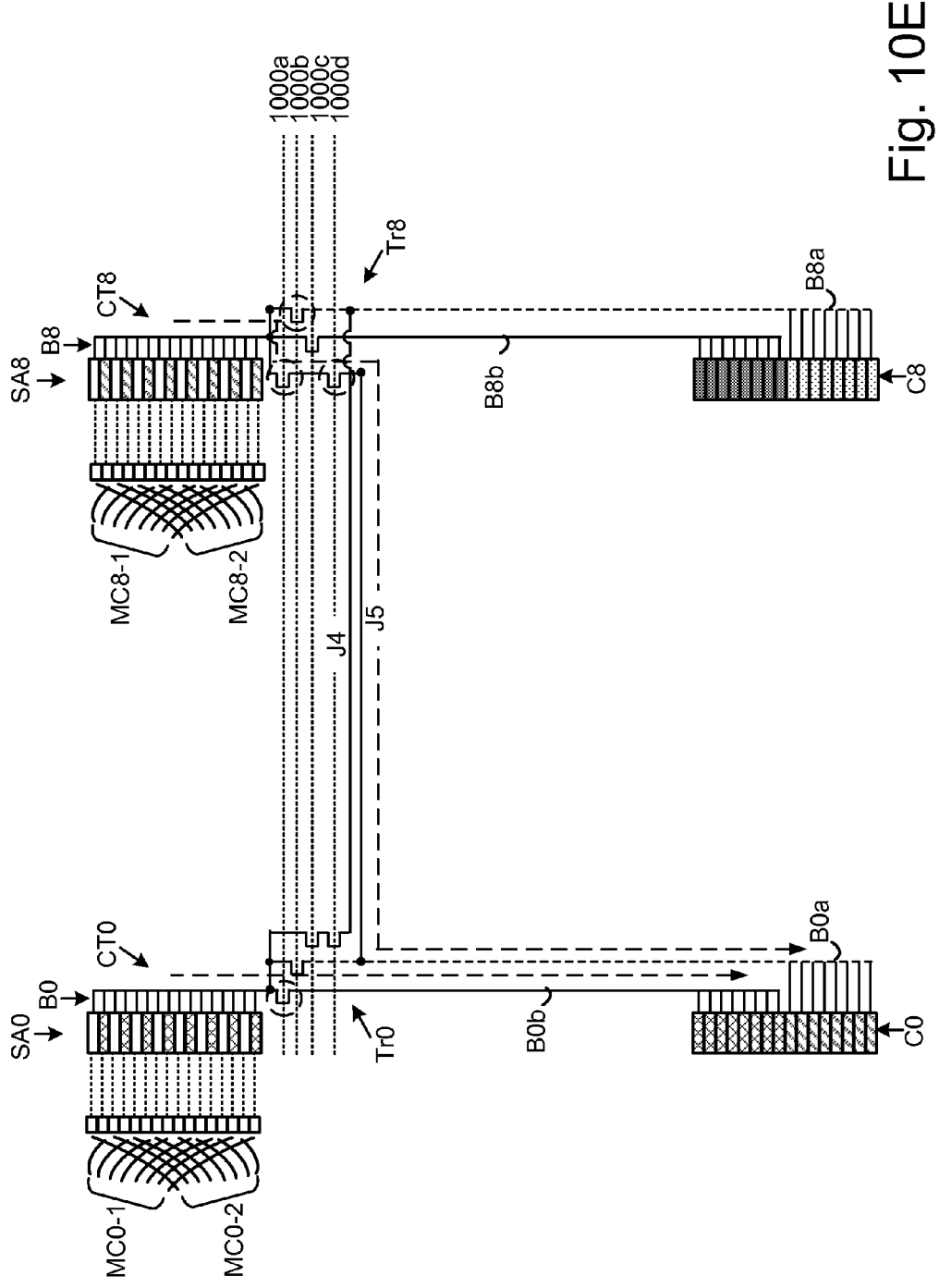
FIG. 10E depicts an example transfer of data in the cache tiers CT0 and CT8 of FIG. 10A during a read operation, where a first half (e.g., lower byte) of a data word is transferred from CT8 to CT0, and a second half (e.g., upper byte) of a data word is transferred within CT0, and even-numbered sense amplifiers are used in the transfer.
Figure 10F:
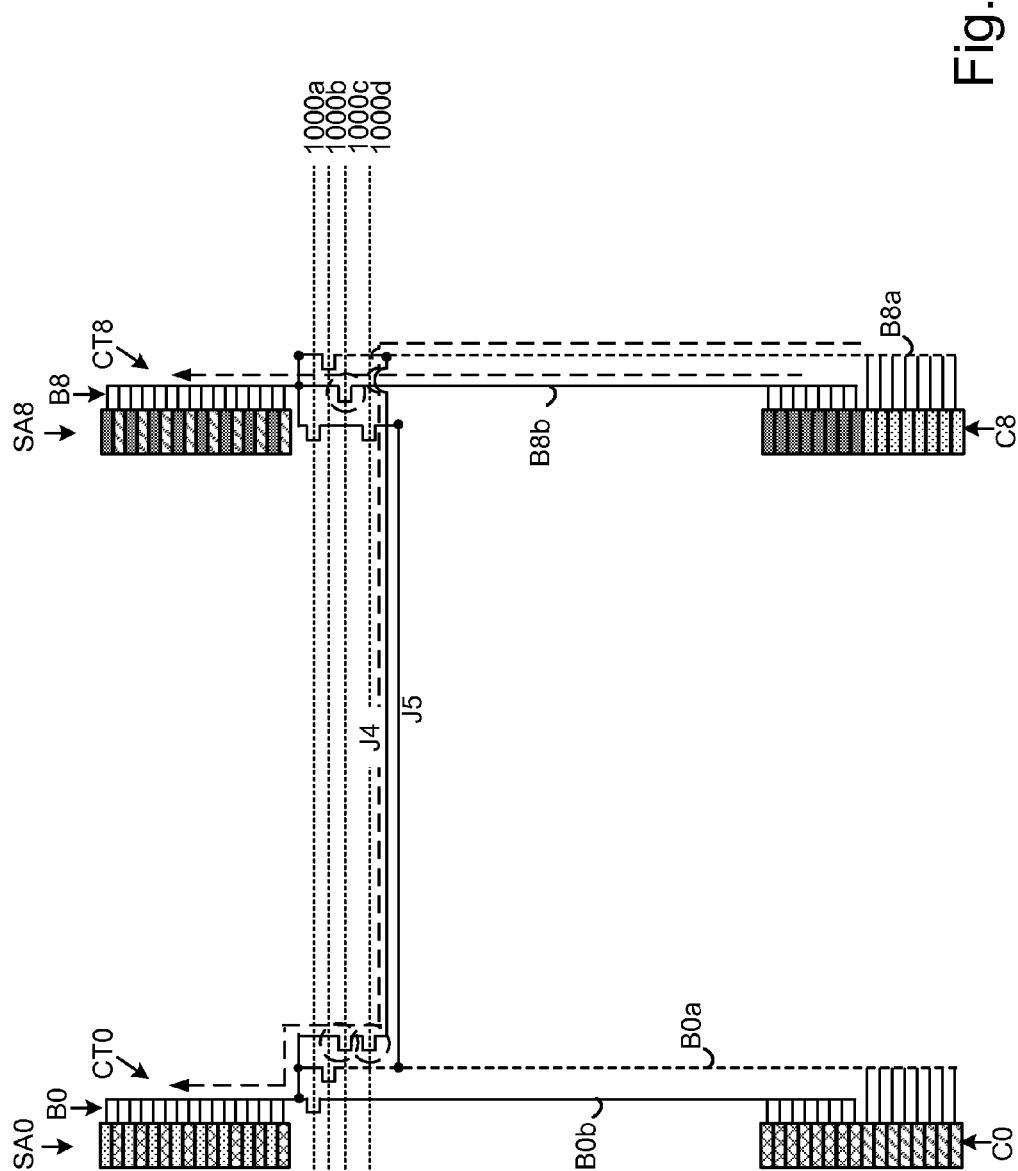
FIG. 10F depicts an example transfer of data in the cache tiers CT0 and CT8 of FIG. 10A during a programming operation, where a first half (e.g., lower byte) of a data word is transferred from CT8 to CT0, and a second half (e.g., upper byte) of a data word is transferred within CT8, and odd-numbered sense amplifiers are used in the transfer.
Figure 10G:
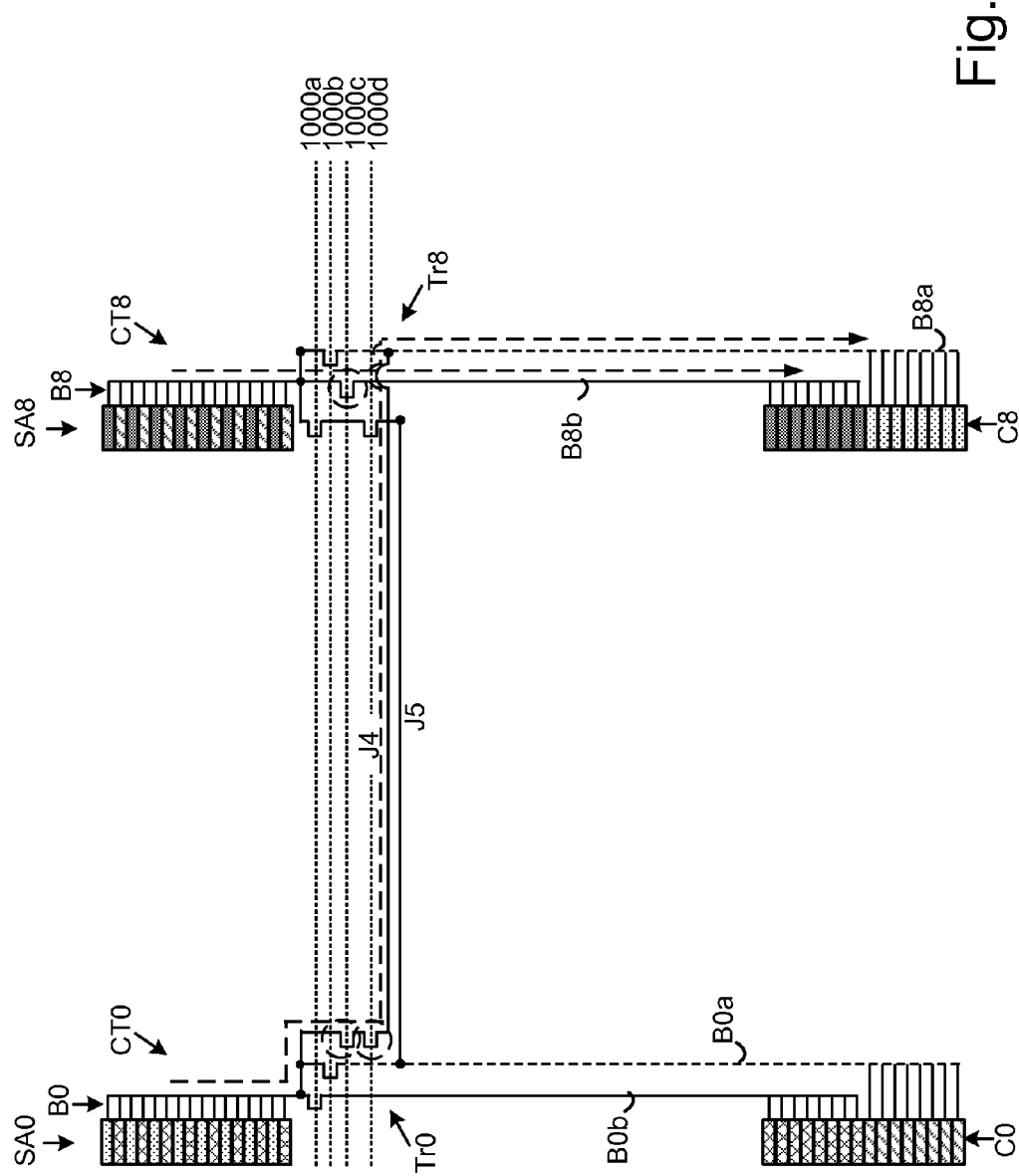
FIG. 10G depicts an example transfer of data in the cache tiers CT0 and CT8 of FIG. 10A during a read operation, where a first half (e.g., lower byte) of a data word is transferred from CT0 to CT8, and a second half (e.g., upper byte) of a data word is transferred within CT8, and odd-numbered sense amplifiers are used in the transfer.

The transfers of FIG. 10E-10G can occur in the first mode of FIG. 10A, for example.

FIG. 10E depicts an example transfer of data in the cache tiers CT0 and CT8 of FIG. 10A during a read operation, where a first half (e.g., lower byte) of a data word is transferred from CT8 to CT0, and a second half (e.g., upper byte) of a data word is transferred within CT0, and even-numbered sense amplifiers are used in the transfer. For the same-tier transfer, which can occur at the same time, data is transferred to cache(8), cache(9), cache(10), cache(11), cache(12), cache(13), cache(14) and cache(15) in CT0 from SA(0), SA(2), SA(4), SA(6), SA(8), SA(10), SA(12) and SA(14), respectively, in CT0 via B0b. For the cross-tier transfer, data is transferred to cache(0), cache(1), cache(2), cache(3), cache(4), cache(5), cache(6) and cache(7) in CT0 from SA(0), SA(2), SA(4), SA(6), SA(8), SA(10), SA(12) and SA(14), respectively, in CT8 via J5 and B0a.

Note that the same-tier transfer and the cross-tier transfer can occur concurrently. To achieve this, two cache access lines are selected concurrently, e.g., one of ca0-ca1 and one of ca8-ca15. One sense amp access line may also be selected, e.g., one of sa0-sa15.

Example memory cells are also depicted which are connected to the bit lines of FIG. 10C and the SAs. For example, MC0-1 is a first set of every other memory cell (e.g., even-numbered memory cells) associated with BL0-1 and SA0-1, MC0-2 is a second set of every other memory cell (e.g., odd-numbered memory cells) associated with BL0-2 and SA0-2, MC8-1 is a first set of every other memory cell (e.g., even-numbered memory cells) associated with BL8-1 and SA8-1, and MC8-2 is a second set of every other memory cell (e.g., odd-numbered memory cells) associated with BL8-2 and SA8-2.

FIG. 10F depicts an example transfer of data in the cache tiers CT0 and CT8 of FIG. 10A during a programming operation, where a first half (e.g., lower byte) of a data word is transferred from CT8 to CT0, and a second half (e.g., upper byte) of a data word is transferred within CT8, and odd-numbered sense amplifiers are used in the transfer. For the same-tier transfer, data in cache(8), cache(9), cache(10), cache(11), cache(12), cache(13), cache(14) and cache(15) in CT8 is transferred to SA(1), SA(3), SA(5), SA(7), SA(9), SA(11), SA(13) and SA(15), respectively, in CT8 via B8b. For the cross-tier transfer, which can occur at the same time, data in cache(0), cache(1), cache(2), cache(3), cache(4), cache(5), cache(6) and cache(7) in CT8 is transferred to SA(1), SA(3), SA(5), SA(7), SA(9), SA(11), SA(13) and SA(15), respectively, in CT0 via B8a and J4.

FIG. 10G depicts an example transfer of data in the cache tiers CT0 and CT8 of FIG. 10A during a read operation, where a first half (e.g., lower byte) of a data word is transferred from CT0 to CT8, and a second half (e.g., upper byte) of a data word is transferred within CT8, and odd-numbered sense amplifiers are used in the transfer. The first half and second half are transferred in parallel, e.g., concurrently. For the same-tier transfer, data is transferred to cache(8), cache(9), cache(10), cache(11), cache(12), cache (13), cache(14) and cache(15) in CT8 from SA(1), SA(3), SA(5), SA(7), SA(9), SA(11), SA(13) and SA(15), respectively, in CT8 via B8b. For the cross-tier transfer, which can occur at the same time, data is transferred to cache(0), cache(1), cache(2), cache(3), cache(4), cache(5), cache(6) and cache(7) in CT8 from SA(1), SA(3), SA(5), SA(7), SA(9), SA(11), SA(13) and SA(15), respectively, in CT0 via J4 and B8a.

Figure 11A:
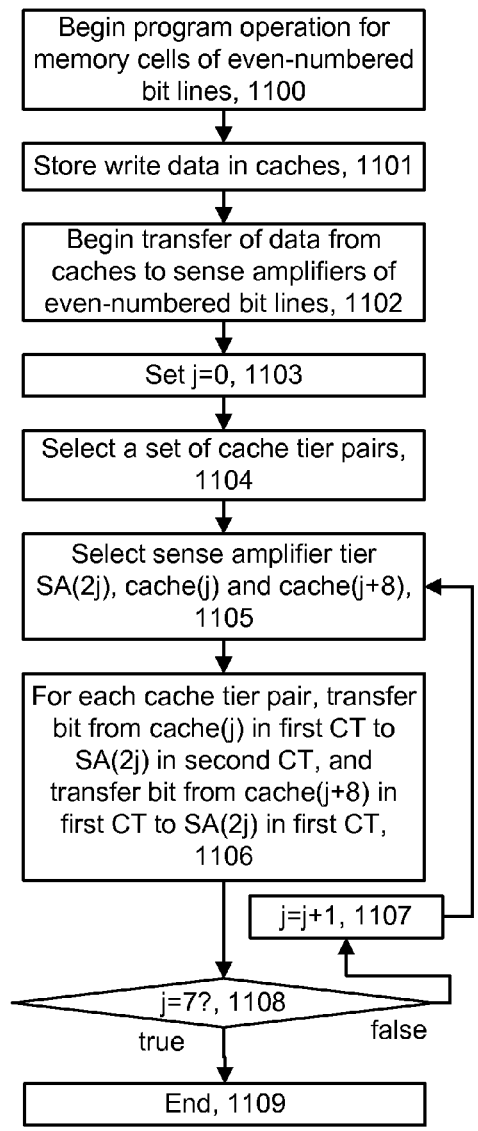
FIG. 11A depicts an example process for transferring data in a programming operation for even-numbered bit lines using the example of FIG. 10D, as applied to the example sensing circuit of FIG. 6A.

FIG. 11A depicts an example process for transferring data in a programming operation for even-numbered bit lines using the example of FIG. 10D, as applied to the example sensing circuit of FIG. 6A. See also FIG. 10D. Step 1100 begins a program operation for memory cells of even-numbered bit lines. Step 1101 stores write data in caches. Step 1102 begins a transfer of data from caches to sense amplifiers of even-numbered bit lines. Step 1103 sets j=0, 1103. Step 1104 selects a set of cache tier pairs. For example, in FIG. 10A, the four pairs are C0 and C8, C2 and C10, C4 and C12, and C6 and C14. Each cache tier pair includes first and second cache tiers, or one CT and another CT. Step 1105 selects a sense amplifier tier SA(2j), cache(j) and cache(j+8). Thus, two cache rows are selected at the same time. Step 1106 includes, for each cache tier pair, transferring a bit from cache(j) in the first CT to SA(2j) in the second cache tier, and concurrently transferring a bit from cache(j+8) in the first CT to SA(2j) in the first CT. Thus, data is transferred from two caches at the same time. If j=7, for example, at decision step 1108, the process ends at step 1109. If decision step 1108 is false, j is incremented at step 1107 and step 1105 follows.

Figure 11B:
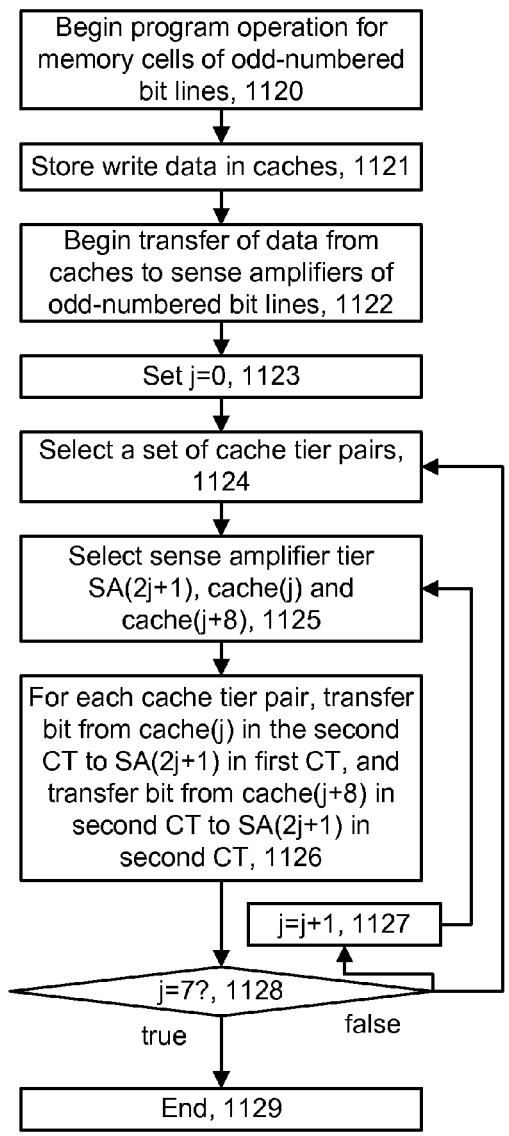
FIG. 11B depicts an example process for transferring data in a programming operation for odd-numbered bit lines using the example of FIG. 10F, as applied to the example sensing circuit of FIG. 6A.

FIG. 11B depicts an example process for transferring data in a programming operation for odd-numbered bit lines using the example of FIG. 10F, as applied to the example sensing circuit of FIG. 6A. See also FIG. 10F. Step 1120 begins a program operation for memory cells of odd-numbered bit lines. Step 1121 stores write data in caches. Step 1122 begins a transfer of data from caches to sense amplifiers of odd-numbered bit lines. Step 1123 sets j=0, 1103. Step 1124 selects a set of cache tier pairs such as described in connection with step 1105 of FIG. 11A. Step 1125 selects a sense amplifier tier SA(2j+1), cache(j) and cache(j+8). Step 1126 includes, for each cache tier pair, transferring a bit from cache(j) in the second CT to SA(2j+1) in the first cache tier, and concurrently transferring a bit from cache(j+8) in the second CT to SA(2j+1) in the second CT. Thus, data is transferred from two caches at the same time. If j=7, for example, at decision step 1128, the process ends at step 1129. If decision step 1128 is false, j is incremented at step 1127 and step 1125 follows.

Figure 11C:
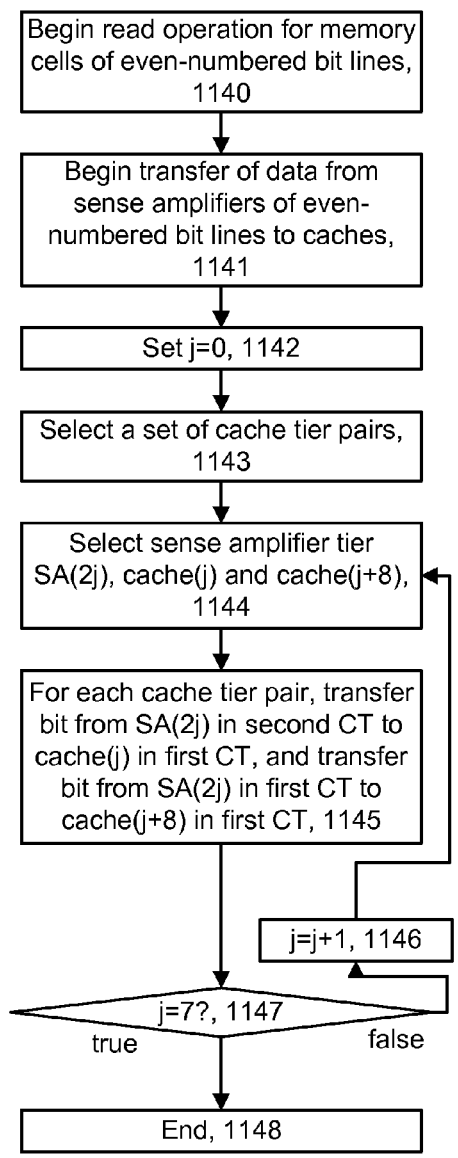
FIG. 11C depicts an example process for transferring data in a reading operation for even-numbered bit lines using the example of FIG. 10E, as applied to the example sensing circuit of FIG. 6A.

FIG. 11C depicts an example process for transferring data in a reading operation for even-numbered bit lines using the example of FIG. 10E, as applied to the example sensing circuit of FIG. 6A. Step 1140 begins a read operation for memory cells of even-numbered bit lines. Step 1141 begins a transfer of data from sense amplifiers of even-numbered bit lines to caches. Step 1142 sets j=0. Step 1143 selects a set of cache tier pairs, as discussed previously. Step 1144 selects a sense amplifier tier SA(2j), cache(j) and cache(j+8). Step 1145 includes, for each cache tier pair, transferring a bit from SA(2j) in the second CT to cache(j) in the first CT, and concurrently transferring a bit from SA(2j) in the first CT to cache(j+8) in the first CT. If j=7, for example, at decision step 1147, the process ends at step 1148. If decision step 1147 is false, j is incremented at step 1146 and step 1144 follows.

Figure 11D:
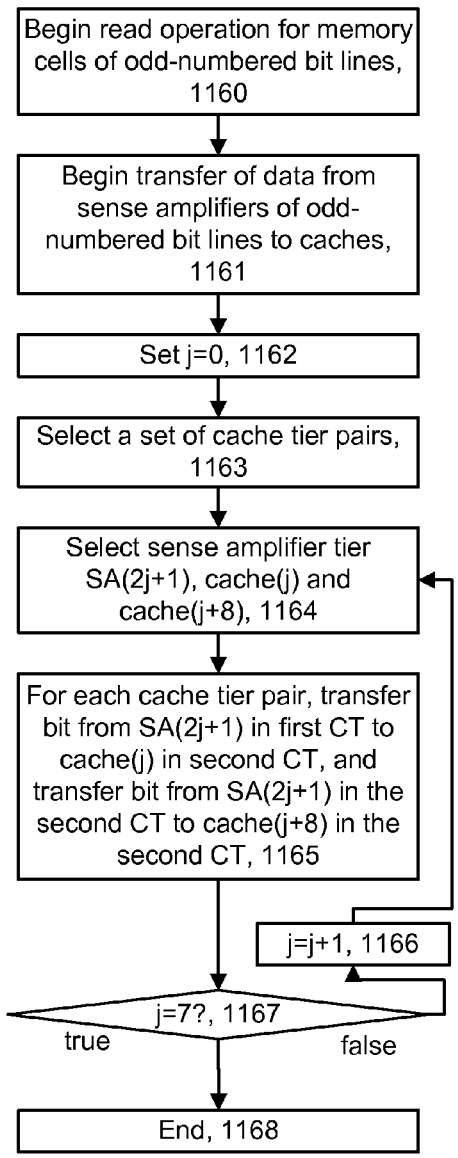
FIG. 11D depicts an example process for transferring data in a reading operation for odd-numbered bit lines using the example of FIG. 10G, as applied to the example sensing circuit of FIG. 6A.

FIG. 11D depicts an example process for transferring data in a reading operation for odd-numbered bit lines using the example of FIG. 10G, as applied to the example sensing circuit of FIG. 6A. Step 1160 begins a read operation for memory cells of even-numbered bit lines. Step 1161 begins a transfer of data from sense amplifiers of odd-numbered bit lines to caches. Step 1162 sets j=0. Step 1163 selects a set of cache tier pairs, as discussed previously. Step 1164 selects a sense amplifier tier SA(2j+1), cache(j) and cache(j+8). Step 1165 includes, for each cache tier pair, transferring a bit from SA(2j+1) in the first CT to cache(j) in the second CT, and concurrently transferring a bit from SA(2j+1) in the second CT to cache(j+8) in the second CT. If j=7, for example, at decision step 1167, the process ends at step 1168. If decision step 1167 is false, j is incremented at step 1166 and step 1164 follows.

Figure 12A:
FIG. 12A depicts an example sequence for selecting cache tiers and sense amplifier tiers in a full page program or read operation, consistent with the process of FIGS. 7D and 7E.

FIG. 12A depicts an example sequence for selecting cache tiers and sense amplifier tiers in a full page program or read operation, consistent with the process of FIGS. 7D and 7E. In a full page, e.g., where 16 KB of data is transferred, the cache tiers CT0-CT15 are selected while the SA tiers of SAT0, SAT1, . . . , SAT15 are then selected in turn. Recall from FIG. 6A that a SA tier or row comprises the SAs connected to a common SA line. Thus, SAT0-SAT15 comprise the SAs connected to sac0-sac15, respectively.

Figure 12B:
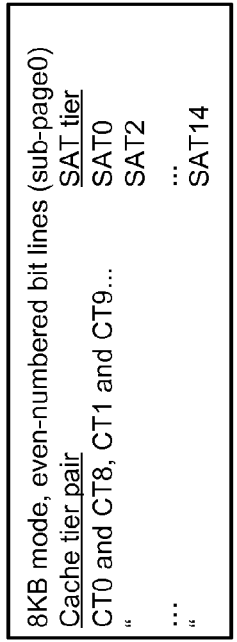
FIG. 12B depicts an example sequence for selecting cache tiers and sense amplifier tires in a program or read operation for a half page comprising even-numbered bit lines, consistent with the processes of FIGS. 11A and 11C.

FIG. 12B depicts an example sequence for selecting cache tiers and sense amplifier tires in a program or read operation for a half page comprising even-numbered bit lines, consistent with the processes of FIGS. 11A and 11C. In a first sub-page, e.g., where 8 KB of data is transferred to/from even-numbered bit lines, the cache tiers CT0 and CT8, CT1 and CT9, CT2 and CT10, . . . are selected. Consistent with FIG. 6A, there may be even-numbered cache tier pairs and off-numbered cache tier pairs. The even-numbered SA tiers of SAT0, SAT2, . . . , SAT14 are then selected in turn.

Figure 12C:
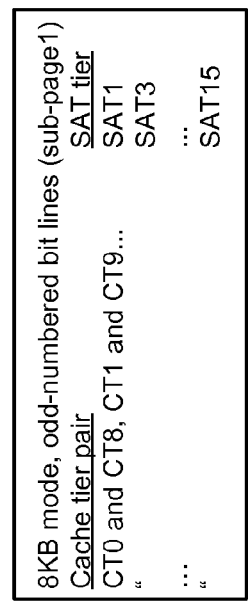
FIG. 12C depicts an example sequence for selecting cache tiers and sense amplifier tires in a program or read operation for a half page comprising odd-numbered bit lines, consistent with the processes of FIGS. 11B and 11D.

FIG. 12C depicts an example sequence for selecting cache tiers and sense amplifier tires in a program or read operation for a half page comprising odd-numbered bit lines, consistent with the processes of FIGS. 11B and 11D. In a second sub-page, e.g., where 8 KB of data is transferred to/from odd-numbered bit lines, the cache tiers CT0 and CT8, CT1 and CT9, CT2 and CT10, . . . are selected. The odd-numbered SA tiers of SAT1, SAT3, . . . , SAT15 are then selected in turn.

Figure 13A:
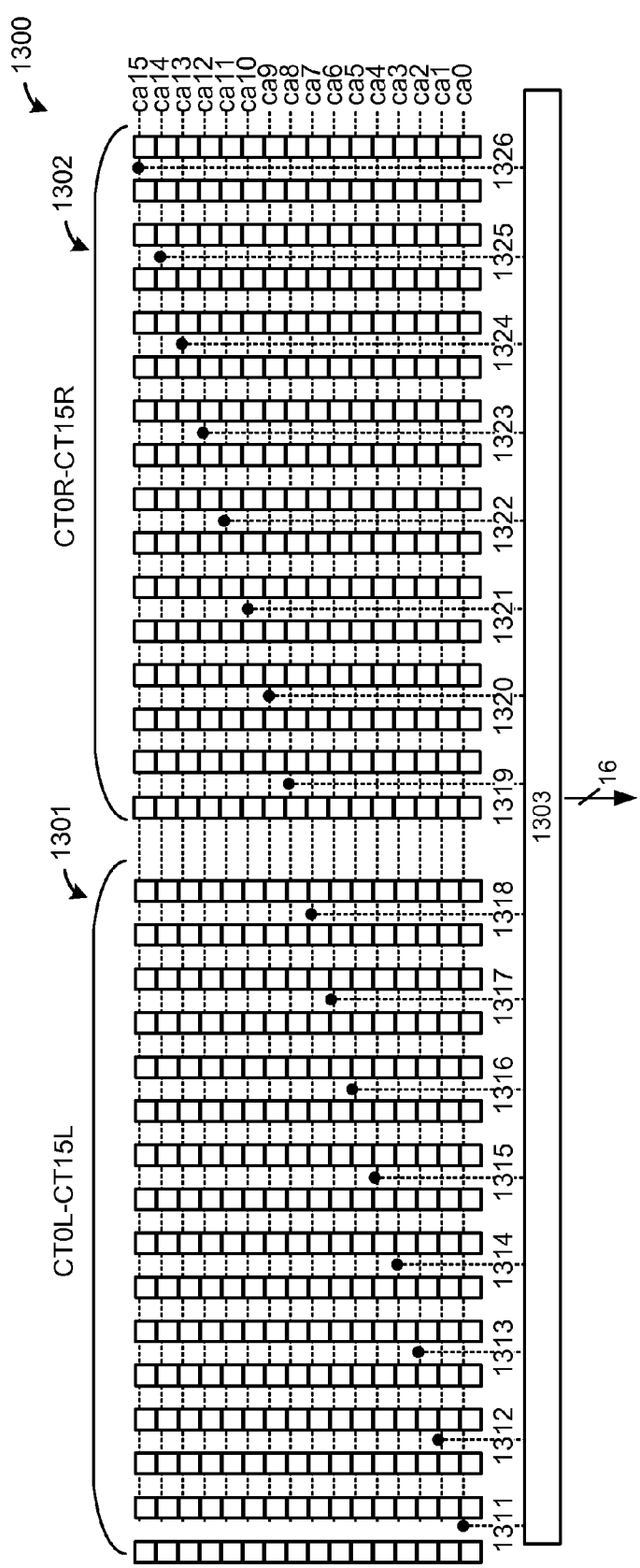
FIG. 13A depicts an example arrangement of a pair of the sensing circuits of FIG. 6A, where a common set of cache access lines is used.

FIG. 13A depicts an example arrangement of a pair of the sensing circuits of FIG. 6A, where a common set of cache access lines is used. A sensing circuit 1300 includes a left hand sensing portion 1301, comprising 16 cache tiers CT0L-CT15L, and a right hand sensing portion 1302, comprising 16 cache tiers CT0R-CT15R, in this example implementation. A 16-bit multiplexer includes input/output paths 1311-1326. Each input/output path is connected to a respective cache access line ca0-cl15 and each cache access line extends across, and is shared by, the left and right hand sensing portions. The cache control lines and cache tier control lines are not depicted, for simplicity. Further, each cache tier can be independently selected, so that one cache tier is active when data is input or output. However, with this approach, a fast read mode cannot be used such as when even-numbered bit lines are read separately from odd-numbered bit lines. Instead, the caches must be filled by data from SAs of both the even-numbered bit lines and the odd-numbered bit lines. A full word of data should be output from a set of caches at an output time.

Figure 13B:
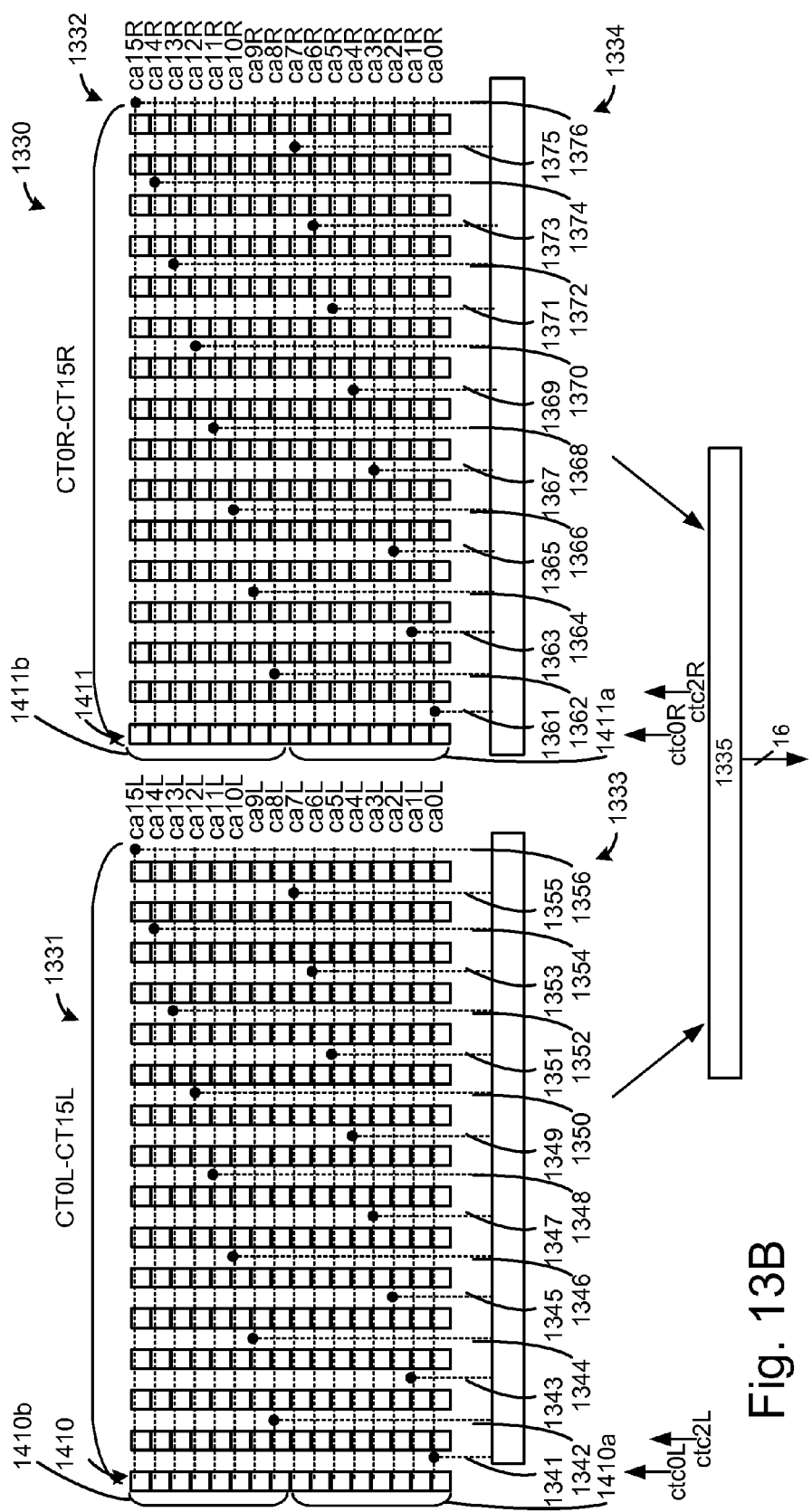
FIG. 13B depicts another example arrangement of a pair of the sensing circuits of FIG. 6A, where separate sets of cache access lines are used.

FIG. 13B depicts another example arrangement of a pair of the sensing circuits of FIG. 6A, where separate sets of cache access lines are used. A sensing circuit 1330 includes a left hand sensing portion 1331, comprising 16 cache tiers CT0L-CT15L, and a right hand sensing portion 1332, comprising 16 cache tiers CT0R-CT15R, in this example implementation. A 16-bit multiplexer 1333 or 1334 is provided for each of the left and right hand portions. Furthermore, the left hand sensing portion includes input/output paths 1341-1356 and the right hand sensing portion includes input/output paths 1361-1376. A separate set of cache access lines is also provided for each sensing portion. The left hand sensing portion includes cache access lines ca0L-ca15L. The right hand sensing portion includes cache access lines ca0R-ca15R. The multiplexers 1333 and 1334 may be connected to another 16-bit multiplexer 1335.

In one approach, the left hand sensing portion is selected and data is concurrently input or output from each of the input/output paths 1341-1356 and the multiplexers 1333 and 1335. Subsequently, the right hand sensing portion is selected and data is concurrently input or output from each of the input/output paths 1361-1376 and the multiplexers 1334 and 1335. In another approach, data is concurrently input or output from half of the input/output paths 1341-1356 and from half of the input/output paths 1361-1376.

Thus, a half word can be transferred from each of the left and right hand sensing portions in respective cache tiers at a time, so that a full word is transferred from the sensing circuit at a time. This results in a 50% reduction in the data transfer time compared to transferring one word from one cache tier.

Figure 13C:
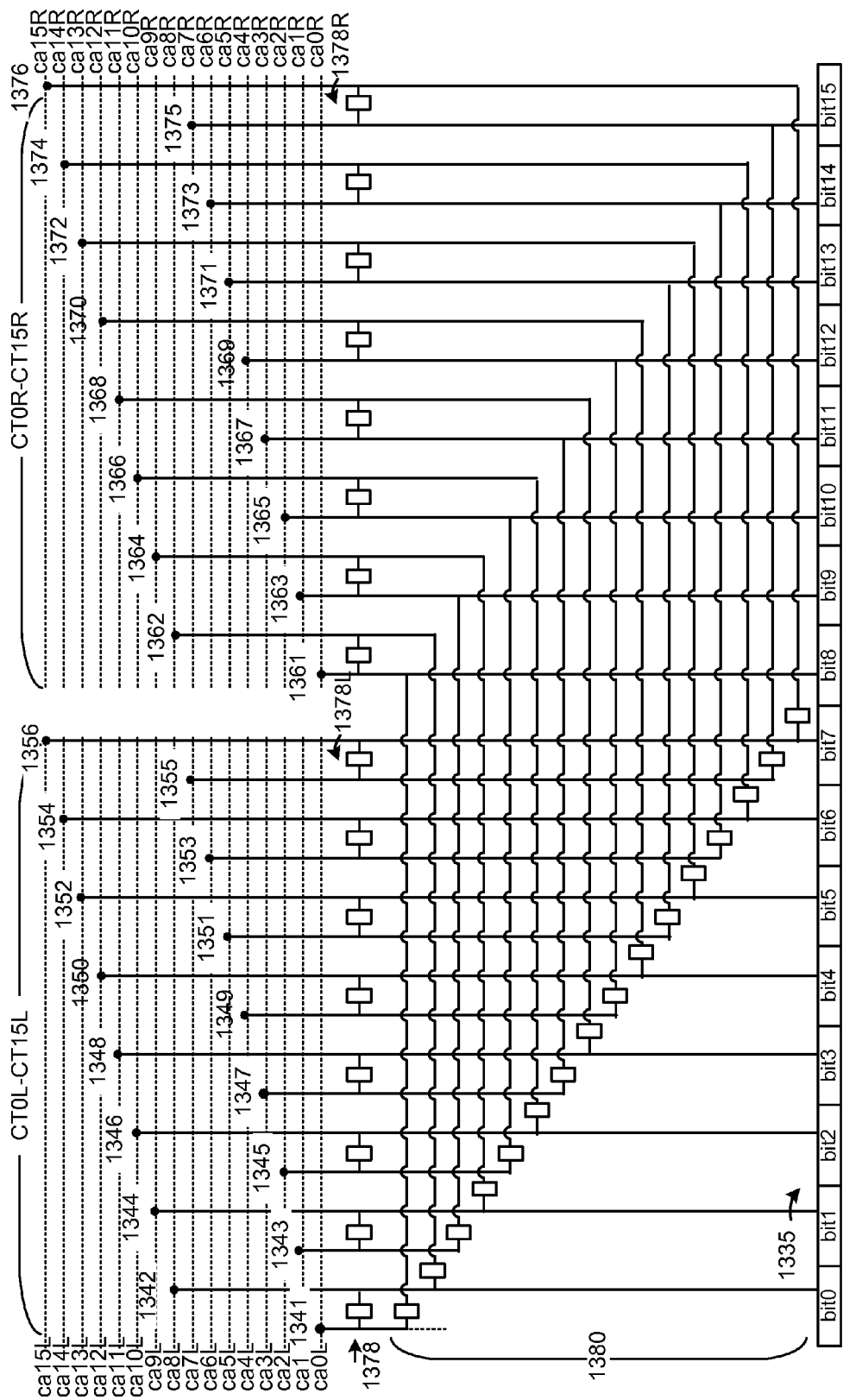
FIG. 13C depicts a circuit based on the arrangement of FIG. 13B.

FIG. 13C depicts a circuit based on the arrangement of FIG. 13B. Pairs of the input/output paths are connected to respective transistors 1378. Each box represents one or more transistors or other switching components. For example, input/output paths 1341 and 1342 are connected to a respective transistor, input/output paths 1341 and 1342 are connected to a respective transistor and so forth. Additional transistors 1380 are also depicted. Each transistor can be controlled by control signals (not shown). Each transistor can be controlled to be an open circuit (a non-conductive path) or a short circuit (a conductive path). For example, for a full page read, the transistors 1378 are open circuits and the transistors 1380 are short circuits. As a result, the input/output paths 1342, 1344, 1346, 1348, 1350, 1352, 1354 and 1356 are connected to the multiplexer 1335 in bit positions bit0-bit7, respectively, and the input/output paths 1341, 1343, 1345, 1347, 1349, 1351, 1353 and 1355 are connected to the multiplexer at bit8-bit15, respectively, when one of the cache tiers CT0L-CT15L is selected. Data can be concurrently output from the selected cache tier via the cache access lines ca0L-ca15L.

Or, the input/output paths 1362, 1364, 1366, 1368, 1370, 1372, 1374 and 1376 are connected to the multiplexer in bit positions bit0-bit7, respectively, and the input/output paths 1361, 1363, 1365, 1367, 1369, 1371, 1373 and 1375 are connected to the multiplexer at bit8-bit15, respectively, when one of the cache tiers CT0R-CT15R is selected. Data can be concurrently output from the selected cache tier via the cache access lines ca0R-ca15R. Thus, either of the left or right hand sensing portions can be read in a full page read mode.

For a half page read, e.g., using odd-numbered bit lines or even-numbered bit lines, the transistors 1380 are open circuits and the transistors 1378 are short circuits. As a result, in the left hand sensing portion, if the cache access lines ca0L-ca7L are selected, the input/output paths 1341, 1343, 1345, 1347, 1349, 1351, 1353 and 1355 are connected to the multiplexer at bit0-bit7, respectively. Thus, a half of a word, e.g., a lower byte, can be output from the left hand sensing portion. Or, if the cache access lines cl8L-cl15L are selected, the input/output paths 1342, 1344, 1346, 1348, 1350, 1352, 1354 and 1356 are connected to the multiplexer at bit0-bit7, respectively. Thus, another half of the word, e.g., an upper byte, can be output from the left hand sensing portion.

At the same time a half word from cache access lines ca0L-ca7L or ca8L-ca15L is output from the left hand sensing portion, a half word from cache access lines ca0R-ca7R or ca8R-ca15R can be output from the right hand sensing portion. For example, in the right hand sensing portion, if the cache access lines ca0R-ca7R are selected, the input/output paths 1361, 1363, 1365, 1367, 1369, 1371, 1373 and 1375 are connected to the multiplexer at bit8-bit15, respectively. Thus, a half of a word, e.g., a lower byte, can be output from the right hand sensing portion. Or, if the cache access lines ca8R-ca15R are selected, the input/output paths 1362, 1364, 1366, 1368, 1370, 1372, 1374 and 1376 are connected to the multiplexer at bit8-bit15, respectively. Thus, another half of the word, e.g., an upper byte, can be output from the right hand sensing portion.

FIG. 13D depicts another example arrangement of a pair of the sensing circuits of FIG. 6A. A sensing circuit 1377 includes a left hand sensing portion 1378, comprising 16 cache tiers CT0L-CT15L, and a right hand sensing portion 1379, comprising 16 cache tiers CT0R-CT15R, in this example implementation. A 16-bit multiplexer 1381L or 1381R is provided for each of the left and right hand portions, respectively. Furthermore, the left hand sensing portion includes input/output paths 1382-1389 and the right hand sensing portion includes input/output paths 1390-1397. A separate set of cache access lines is also provided for each sensing portion. The left hand sensing portion includes cache access lines ca0L-ca15L. The right hand sensing portion includes cache access lines ca0R-ca15R. The multiplexers 1381L and 1381R may be connected to another 16-bit multiplexer 1398.

Furthermore, each of the input/output paths is connected to two cache access lines, rather than to one cache access line as in FIG. 13C. As a result, each input/output path can transfer data to or from one of two caches depending on which cache access line is selected. For example, the input/output path 1382 can transfer data to or from a cache connected to ca0L if that cache access line is selected or ca8L if that cache access lines is selected.

In one approach, the left hand sensing portion is selected and data is concurrently input or output from each of the input/output paths 1382-1389 from respective caches which are connected to the cache access lines ca0L and ca8L in a selected cache tier. Thus, data can be concurrently input/output for half of the caches in a cache tier in the left hand sensing portion. This could be 8 bits of data, such as one half of a word, e.g., a lower byte. In another example, the left hand sensing portion is selected and data is concurrently input or output from each of the input/output paths 1382-1389 from respective caches which are connected to the cache access lines ca8L and ca15L in a selected cache tier. This could be 8 bits of data, such as another half of a word, e.g., an upper byte. In these options, data is input/output from adjacent caches. It is also possible for data to be input/output from non-adjacent caches.

At the same time that data is input/output from half of the caches in a cache tier in the left hand sensing portion, data can be input/output from half of the caches in a cache tier in the right hand sensing portion. For example, data can be concurrently input or output from each of the input/output paths 1390-1397 from respective caches which are connected to the cache access lines ca0R and ca8R in a selected cache tier. This could be one half of a word, e.g., a lower byte. In another example, data is concurrently input or output from each of the input/output paths 1390-1397 from respective caches which are connected to the cache access lines ca8R and ca15R in a selected cache tier. This could be another half of a word, e.g., an upper byte. The multiplexer provides a 16 bit output using 8 bits from each of the left and right hand sensing portions.

FIG. 13E depicts a set of caches in a left hand sensing portion and a right hand sensing portion, consistent with FIG. 13B-13D. A word of data W1 is stored in a set of caches C0L in the left hand sensing portion, while a word of data W2 is stored in a set of caches C0R in the right hand sensing portion. The word W1 comprises a first half W1a which is stored in a first half C0-1L of the caches, and a second half W1b which is stored in a second half C0-2L of the caches. The word W2 comprises a first half W2a which is stored in a first half C0-1R of the caches, and a second half W2b which is stored in a second half C0-2R of the caches.

FIG. 13B-13E provide an example of a sensing circuit comprising a plurality of sense amplifiers and a plurality of caches, one cache per sense amplifier, wherein each sense amplifier is connected to a respective memory cell in a word line via a respective bit line, the respective bit lines comprise a first set of every other bit line and a second set of every other bit line, and the plurality of sense amplifiers and the plurality of caches are arranged in a plurality of tiers including a first tier (1410) and a second tier (1411), wherein: the first tier comprises N sense amplifiers including N/2 sense amplifiers associated with the first set of every other bit line, N/2 sense amplifiers associated with the second set of every other bit line, and N caches including a first set of N/2 caches (1410*a* or 1410*b*) and a second set of N/2 caches (1410*b* or 1410*a*); the second tier comprises N sense amplifiers including N/2 sense amplifiers associated with the first set of every other bit line, N/2 sense amplifiers associated with the second set of every other bit line, and N caches including a first set of N/2 caches (1411*a*) and a second set of N/2 caches (1411*b*); and a data bus (1335) of size N bits comprising input paths (1341-1376) which are connected to the first set of N/2 caches of the first tier and to the first set of N/2 caches of the second tier in a first mode, and which are connected to the second set of N/2 caches of the first tier and to the second set of N/2 caches of the second tier in a second mode.

For example, in FIG. 13B, in the first mode, input paths 1341, 1343, 1345, 1347, 1349, 1351, 1353 and 1355 are connected to the first set of N/2 caches (1410*a*) of the first tier and input paths 1361, 1363, 1365, 1367, 1369, 1371, 1373 and 1375 are connected to the first set of N/2 caches (1411*a*) in the second tier. In the second mode, input paths 1342, 1344, 1346, 1348, 1350, 1352, 1354 and 1356 are connected to the second set of N/2 caches (1410*b*) of the first tier and input paths 1362, 1364, 1366, 1368, 1370, 1372, 1374 and 1376 are connected to the second set of N/2 caches (1411*a*) in the second tier.

In FIG. 13C, the circuit may include a first set of N/2 cache access lines (ca0L-ca7L) connected to the first set of N/2 caches (1410*a*) of the first tier, one cache access line per cache; a second set of N/2 cache access lines (ca8L-ca15L) connected to the second set of N/2 caches (1410*b*) of the first tier, one cache access line per cache; a third set of N/2 cache access lines (ca0R-ca7R) connected to the first set of N/2 caches (1411*a*) of the second tier, one cache access line per cache; a fourth set of N/2 cache access lines (ca8R-ca15R) connected to the second set of N/2 caches (1411*b*) of the second tier, one cache access line per cache; a first set of N/2 transistors (1378L), each transistor of the first set of N/2 transistors is connected to one of the N/2 cache access lines of the first set of N/2 cache access lines, to one of the N/2 cache access lines of the second set of N/2 cache access lines and to the data bus (1335); and a second set of N/2 transistors (1378R), each transistor of the second set of N/2 transistors is connected to one of the N/2 cache access lines (ca0R-ca7R) of the third set of N/2 cache access lines, to one of the N/2 cache access lines (ca8R-ca15R) of the fourth set of N/2 cache access lines and to the data bus.

The data bus 1335 has a first part (bit0-bit7) of size N/2 bits and a second part (bit8-bit15) of size of N/2 bits; in the first mode, concurrently the first part is connected to the first set of N/2 caches of the first tier and the second part is connected to the first set of N/2 caches of the second tier; and in the second mode, concurrently the first part is connected to the second set of N/2 caches of the first tier and the second part is connected to the second set of N/2 caches of the second tier.

A control circuit in a programming operation is configured to: in the first mode, concurrently transfer a first half of a first word of data from the data bus to the first set of N/2 caches of the first tier and transfer a first half of a second word of data from the data bus to the first set of N/2 caches of the second tier; and in the second mode, concurrently transfer a second half of the first word of data from the data bus to the second set of N/2 caches of the first tier and transfer a second half of the second word of data from the data bus to the second set of N/2 caches of the second tier. Further, the control circuit in the programming operation is configured to: transfer the first half of the first word of data from the first set of N/2 caches of the first tier to a first half of the sense amplifiers of the first tier and transfer the second half of the first word of data from the second set of N/2 caches of the first tier to a second half of the sense amplifiers of the first tier; and transfer the first half of the second word of data from the first set of N/2 caches of the second tier to a first half of the sense amplifiers of the second tier and transfer the second half of the second word of data from the second set of N/2 caches of the second tier to a second half of the sense amplifiers of the second tier.

In the above example, one selection line (ctc0L) is connected to the first set of N/2 caches of the first tier and the second set of N/2 caches of the first tier, and one selection line (ctc0R) is connected to the first set of N/2 caches of the second tier and the second set of N/2 caches of the second tier. See FIG. 13B. In another possible option, in the first tier, one selection line (ctc0L) is connected to the first set of N/2 caches of the first tier and another selection line (ctc2L) is connected to the second set of N/2 caches of the first tier; and in the second tier, one selection line (ctc0R) is connected to the first set of N/2 caches of the second tier and another selection line (ctc2R) is connected to the second set of N/2 caches of the second tier.

FIGS. 14A and 14B depict Vth distributions of memory cells in an example one-pass programming operation with four data states. In this example, the memory cells are initially in the erased state as represented by the Vth distribution 1400 (FIG. 14A). Subsequently, the programming causes the Vth of the A, B and C state cells to reach the Vth distributions 1402, 1404 and 1406, respectively (FIG. 14B). A small number of A, B and C state cells may have a Vth which is below VvA, VvB or VvC, respectively, due to a bit ignore criteria.

The memory cells are initially erased to the Vth distribution 1400 using an erase-verify voltage VvEr. A small number of erased state cells may have a Vth which is above VvEr due to a bit ignore criteria. In this example, there are four possible data states, e.g., the erased (Er) which stores bits 11, the A state which stores bits 01, the B state which stores bits 00 and the C state which stores bits 10. The two bits of a data state represent a lower page and an upper page of data.

The A, B and C state cells can be programmed in one or more passes from the erased state to their final Vth distribution using the verify voltages of VvA, VvB and VvC. Additionally, read voltages VrA, VrB and VrC are used to read the data state of a cell by distinguishing between adjacent data states.

In one embodiment, a circuit comprises: a plurality of sense amplifiers and a plurality of caches, one cache per sense amplifier, wherein each sense amplifier is connected to a respective memory cell in a word line via a respective bit line, the respective bit lines comprise a first set of every other bit line and a second set of every other bit line, and the plurality of sense amplifiers and the plurality of caches are arranged in a plurality of pairs of tiers, each pair of tiers comprising: a first tier and a second tier; the first tier comprising N sense amplifiers including N/2 sense amplifiers associated with the first set of every other bit line and N/2 sense amplifiers associated with the second set of every other bit line; the first tier also comprising N caches including a first set of N/2 caches and a second set of N/2 caches; the second tier comprising N sense amplifiers including N/2 sense amplifiers associated with the first set of every other bit line and N/2 sense amplifiers associated with the second set of every other bit line; and the second tier also comprising N caches including a first set of N/2 caches and a second set of N/2 caches; wherein each pair of tiers comprises switchable paths which are configurable in a first mode in which the N/2 sense amplifiers of the second tier associated with the first set of every other bit line are connected to the first set of N/2 caches of the first tier and the N/2 sense amplifiers of the first tier associated with the first set of every other bit line are connected to the second set of N/2 caches of the first tier, and in a second mode in which the N/2 sense amplifiers of the second tier associated with the second set of every other bit line are connected to the second set of N/2 caches of the second tier and the N/2 sense amplifiers of the first tier associated with the second set of every other bit line are connected to the first set of N/2 caches of the second tier.

The foregoing detailed description of the invention has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A circuit, comprising:
a plurality of sense amplifiers and a plurality of caches, one cache per sense amplifier, wherein each sense amplifier is connected to a respective memory cell in a word line via a respective bit line, the respective bit lines comprise a first set of every other bit line and a second set of every other bit line, and the plurality of sense amplifiers and the plurality of caches are arranged in a plurality of tiers including a first tier and a second tier, wherein:
the first tier comprises N sense amplifiers including N/2 sense amplifiers associated with the first set of every other bit line, N/2 sense amplifiers associated with the second set of every other bit line, and N caches including a first set of N/2 caches and a second set of N/2 caches; and the second tier comprises N sense amplifiers including N/2 sense amplifiers associated with the first set of every other bit line, N/2 sense amplifiers associated with the second set of every other bit line, and N caches including a first set of N/2 caches and a second set of N/2 caches; and the circuit further comprising a data bus of size N bits comprising input N/2 paths which are connected to the first set of N/2 caches of the first tier and to the first set of N/2 caches of the second tier in a first mode, and which are connected to the second set of N/2 caches of the first tier and to the second set of N/2 caches of the second tier in a second mode.

2. The circuit of claim 1, further comprising:
in the first tier, a first selection line connected to the N caches of the first tier; and
in the second tier, a second selection line connected to the N caches of the second tier.

3. The circuit of claim 2, further comprising:
a control circuit, the control circuit is configured to cause the first selection line to select the N caches of the first tier in the first mode and the second mode, and to cause the second selection line to select the N caches of the second tier in the first mode and the second mode.

4. The circuit of claim 2, further comprising:
a first set of N/2 cache access lines connected to the first set of N/2 caches of the first tier, one cache access line per cache;
a second set of N/2 cache access lines connected to the second set of N/2 caches of the first tier, one cache access line per cache;
a third set of N/2 cache access lines connected to the first set of N/2 caches of the second tier, one cache access line per cache;
a fourth set of N/2 cache access lines connected to the second set of N/2 caches of the second tier, one cache access line per cache;
a first set of N/2 transistors, each transistor of the first set of N/2 transistors is connected to one of the N/2 cache access lines of the first set of N/2 cache access lines, to one of the N/2 cache access lines of the second set of N/2 cache access lines and to the data bus; and
a second set of N/2 transistors, each transistor of the second set of N/2 transistors is connected to one of the N/2 cache access lines of the third set of N/2 cache access lines, to one of the N/2 cache access lines of the fourth set of N/2 cache access lines and to the data bus.

5. The circuit of claim 1, further comprising:
in the first tier, one selection line connected to the first set of N/2 caches of the first tier and another selection line connected to the second set of N/2 caches of the first tier; and
in the second tier, one selection line connected to the first set of N/2 caches of the second tier and another selection line connected to the second set of N/2 caches of the second tier.

6. The circuit of claim 5, further comprising:
a control circuit, the control circuit, in the first mode, is configured to cause the one selection line of the first tier to select the first set of N/2 caches of the first tier and to cause the one selection line of the second tier to select the first set of N/2 caches of the second tier and, in the second mode, is configured to cause the another selection line of the first tier to select the second set of N/2 caches of the first tier and to cause the another selection line of the second tier to select the second set of N/2 caches of the second tier.

7. The circuit of claim 5, further comprising:
a first set of N cache access lines connected to the N caches of the first tier, one cache access line per cache, wherein each input path of a first set of N/2 input paths of the data bus is connected to a respective cache in the first set of N/2 caches of the first tier in the first mode and to a respective cache in the second set of N/2 caches of the first tier in the second mode; and
a second set of N cache access lines connected to the N caches of the second tier, one cache access line per cache, wherein each input path of a second set of N/2 input paths of the data bus is connected to a respective cache in the first set of N/2 caches of the second tier in the first mode and to a respective cache in the second set of N/2 caches of the second tier in the second mode.

8. The circuit of claim 1, wherein:
the data bus has a first part of size N/2 bits and a second part of size of N/2 bits;
in the first mode, concurrently the first part is connected to the first set of N/2 caches of the first tier and the second part is connected to the first set of N/2 caches of the second tier; and
in the second mode, concurrently the first part is connected to the second set of N/2 caches of the first tier and the second part is connected to the second set of N/2 caches of the second tier.

9. The circuit of claim 1, wherein:
the first set of every other bit line comprises even-numbered bit lines and the second set of every other bit line comprises odd-numbered bit lines, or the first set of every other bit line comprises odd-numbered bit lines and the second set of every other bit line comprises even-numbered bit lines.

10. The circuit of claim 1, further comprising a control circuit, the control circuit in a programming operation is configured to:
in the first mode, concurrently transfer a first half of a first word of data from the data bus to the first set of N/2 caches of the first tier and transfer a first half of a second word of data from the data bus to the first set of N/2 caches of the second tier; and
in the second mode, concurrently transfer a second half of the first word of data from the data bus to the second set of N/2 caches of the first tier and transfer a second half of the second word of data from the data bus to the second set of N/2 caches of the second tier.

11. The circuit of claim 10, wherein the control circuit in the programming operation is configured to:
transfer the first half of the first word of data from the first set of N/2 caches of the first tier to a first half of the sense amplifiers of the first tier and transfer the second half of the first word of data from the second set of N/2 caches of the first tier to a second half of the sense amplifiers of the first tier; and
transfer the first half of the second word of data from the first set of N/2 caches of the second tier to a first half of the sense amplifiers of the second tier and transfer the second half of the second word of data from the second set of N/2 caches of the second tier to a second half of the sense amplifiers of the second tier.

12. The circuit of claim 1, further comprising a control circuit, the control circuit in a read operation is configured to:

in the first mode at a first time, transfer a first half of a first word of data from the first set of N/2 caches of the first tier to the data bus and transfer a first half of a second word of data from the first set of N/2 caches of the second tier to the data bus; and in the first mode at a second time, transfer a second half of the first word of data from the first set of N/2 caches of the first tier to the data bus and transfer a second half of the second word of data from the first set of N/2 caches of the second tier to the data bus.

13. A sensing method, comprising:

performing a sensing operation involving memory cells, wherein:

a plurality of sense amplifiers and a plurality of caches are provided, one cache per sense amplifier, each sense amplifier is connected to a respective memory cell in a word line via a respective bit line, the respective bit lines comprise a first set of every other bit line and a second set of every other bit line, the plurality of sense amplifiers and the plurality of caches are arranged in at least a first tier and a second tier, the first tier comprising N/2 sense amplifiers associated with the first set of every other bit line, N/2 sense amplifiers associated with the second set of every other bit line, a first set of N/2 caches and a second set of N/2 caches, and the second tier comprising N/2 sense amplifiers associated with the first set of every other bit line, N/2 sense amplifiers associated with the second set of every other bit line, a first set of N/2 caches and a second set of N/2 caches;

the performing the sensing operation comprises in a first period:

sensing memory cells connected to the first set of every other bit line and storing associated data comprising a first half of a first word of data in the N/2 sense amplifiers of the first tier associated with the first set of every other bit line and storing associated data comprising a first half of a second word of data in the N/2 sense amplifiers of the second tier associated with the first set of every other bit line;

transferring the first half of the first word of data from the N/2 sense amplifiers of the first tier associated with the first set of every other bit line to the first set of N/2 caches of the first tier;

transferring the first half of the second word of data from the N/2 sense amplifiers of the second tier associated with the first set of every other bit line to the first set of N/2 caches of the second tier; and outputting via a data bus, from the first set of N/2 caches of the first tier and the first set of N/2 caches of the second tier, a data word comprising the first half of the first word of data and the first half of the second word of data.

14. The sensing method of claim 13, wherein the performing the sensing operation further comprises in a second period:

sensing memory cells connected to the second set of every other bit line and storing associated data comprising a second half of the first word of data in the N/2 sense amplifiers of the first tier associated with the second set of every other bit line and storing associated data comprising a second half of the second word of data in the N/2 sense amplifiers of the second tier associated with the second set of every other bit line;

transferring the second half of the first word of data from the N/2 sense amplifiers of the first tier associated with the second set of every other bit line to the second set of N/2 caches of the first tier;

transferring the second half of the second word of data from the N/2 sense amplifiers of the second tier associated with the second set of every other bit line to the second set of N/2 caches of the second tier; and outputting via the data bus, from the first set of N/2 caches of the first tier and the first set of N/2 caches of the second tier, a data word comprising the second half of the first word of data and the second half of the second word of data.

15. The sensing method of claim 13, wherein:

in the first tier, one selection line is connected to the first set of N/2 caches of the first tier and another selection line is connected to the second set of N/2 caches of the first tier;

in the second tier, one selection line is connected to the first set of N/2 caches of the second tier and another selection line is connected to the second set of N/2 caches of the second tier; and the outputting comprises selecting the one selection line which is connected to the first set of N/2 caches of the first tier, selecting the one selection line which is connected to the first set of N/2 caches of the second tier, not selecting the another selection line which is connected to the second set of N/2 caches of the first tier, and not selecting the another selection line which is connected to the second set of N/2 caches of the second tier.

16. The sensing method of claim 13, wherein:

in the first tier, a first selection line is connected to the N caches of the first tier;

in the second tier, a second selection line is connected to the N caches of the second tier;

a first set of N/2 cache access lines connected to the first set of N/2 caches of the first tier;

a second set of cache access lines is connected to the second set of N/2 caches of the first tier;

a third set of N/2 cache access lines is connected to the first set of N/2 caches of the second tier;

a fourth set of N/2 cache access lines is connected to the second set of N/2 caches of the second tier;

each transistor of a first set of N/2 transistors is connected to one of the N/2 cache access lines of the first set of N/2 cache access lines, one of the N/2 cache access lines of the second set of N/2 cache access lines and an input path of the data bus;

each transistor of a second set of N/2 transistors is connected to one of the N/2 cache access lines of the third set of N/2 cache access lines, one of the N/2 cache access lines of the fourth set of N/2 cache access lines and an input path of the data bus; and the outputting comprises causing the first selection line to select the N caches of the first tier, causing the second selection line to select the N caches of the second tier, providing control signals to each transistor of the first set of N/2 transistors and to each transistor of the second set of N/2 transistors.

17. The sensing method of claim 13, wherein:

the first set of every other bit line comprises even-numbered bit lines and the second set of every other bit line comprises odd-numbered bit lines, or the first set of every other bit line comprises odd-numbered bit lines and the second set of every other bit line comprises even-numbered bit lines.

18. A method, comprising:
performing a programming operation involving memory cells, wherein:
- a plurality of sense amplifiers and a plurality of caches are provided, one cache per sense amplifier,
- each sense amplifier is connected to a respective memory cell in a word line via a respective bit line,
- the respective bit lines comprise a first set of every other bit line and a second set of every other bit line,
- the plurality of sense amplifiers and the plurality of caches are arranged in at least a first tier and a second tier,
- the first tier comprising N/2 sense amplifiers associated with the first set of every other bit line, N/2 sense amplifiers associated with the second set of every other bit line, a first set of N/2 caches and a second set of N/2 caches, and
- the second tier comprising N/2 sense amplifiers associated with the first set of every other bit line, N/2 sense amplifiers associated with the second set of every other bit line, a first set of N/2 caches and a second set of N/2 caches;

the performing the programming operation comprises:
concurrently transferring a first half of a first word of data from a data bus to the first set of N/2 caches of the first tier and transferring a first half of a second word of data from the data bus to the first set of N/2 caches of the second tier; and
concurrently transferring a second half of the first word of data from the data bus to the second set of N/2 caches of the first tier and transferring a second half of the second word of data from the data bus to the second set of N/2 caches of the second tier.

19. The method of claim 18, wherein the performing the programming operation comprises:
transferring the first half of the first word of data from the first set of N/2 caches of the first tier to a first half of the sense amplifiers of the first tier and transferring the second half of the first word of data from the second set of N/2 caches of the first tier to a second half of the sense amplifiers of the first tier; and
transferring the first half of the second word of data from the first set of N/2 caches of the second tier to a first half of the sense amplifiers of the second tier and transferring the second half of the second word of data from the second set of N/2 caches of the second tier to a second half of the sense amplifiers of the second tier.

20. The method of claim 18, wherein:
the first word of data comprises bits of a page of data which is to be programmed into one set of N memory cells; and
the second word of data comprises bits of the page of data which is to be programmed into another set of N memory cells.

* * * * *